US012385860B1

(12) United States Patent
    Kawakami

(10) Patent No.: US 12,385,860 B1
(45) Date of Patent: Aug. 12, 2025

(54) X-RAY FLUORESCENCE SPECTROMETER

(71) Applicant: Rigaku Corporation, Akishima (JP)

(72) Inventor: Hiroyuki Kawakami, Takatsuki (JP)

(73) Assignee: RIGAKU CORPORATION, Tokyo (JP)

( * ) Notice: Subject to any disclaimer, the term of this patent is extended or adjusted under 35 U.S.C. 154(b) by 0 days.

(21) Appl. No.: 18/865,686

(22) PCT Filed: Apr. 10, 2023

(86) PCT No.: PCT/JP2023/014530
§ 371 (c)(1),
(2) Date: Nov. 14, 2024

(87) PCT Pub. No.: WO2023/243197
PCT Pub. Date: Dec. 21, 2023

(30) Foreign Application Priority Data

Jun. 13, 2022 (JP) ................. 2022-095157

(51) Int. Cl.
*G01N 23/2204* (2018.01)
*G01N 23/2209* (2018.01)
*G01N 23/223* (2006.01)

(52) U.S. Cl.
CPC ..... *G01N 23/2204* (2013.01); *G01N 23/2209* (2018.02); *G01N 23/223* (2013.01);
(Continued)

(58) Field of Classification Search
CPC .......... G01N 23/2204; G01N 23/2209; G01N 23/223; G01N 2223/076; G01N 2223/1016; G01N 2223/309; G01N 2223/6116
See application file for complete search history.

(56) References Cited

U.S. PATENT DOCUMENTS 4,260,885 A * 4/1981 Albert ................. G01N 23/223
                                                 378/45
4,972,448 A * 11/1990 Munekawa .......... G01N 23/207
                                                 378/81
(Continued)

FOREIGN PATENT DOCUMENTS

CN          102323284 A     1/2012
CN          102507623 A     6/2012
(Continued)

OTHER PUBLICATIONS

Office Action of Jan. 25, 2025, for corresponding CN Patent Application No. 202380015622.9, pp. 1-6.
(Continued)

*Primary Examiner* — Thomas R Artman
(74) *Attorney, Agent, or Firm* — HEA Law PLLC

(57) ABSTRACT

Provided is an X-ray fluorescence spectrometer that achieves a uniform state on a back side of a thin sheet-shaped sample so as to prevent a difference in a measurement condition depending on a measurement position. The X-ray fluorescence spectrometer includes: a sample stage a background correction cover, which is arranged adjacent to an outer side of the sample stage so that a surface of the background correction cover is substantially flush with a surface of the sample stage; and a moving mechanism. The moving mechanism moves the background correction cover based on movement of the sample stage and, when the sample stage is absent on a back side of the sample at a measurement position, moves the background correction cover so that the background correction cover is located on the back side of the sample at the measurement position.

9 Claims, 17 Drawing Sheets

(52) U.S. Cl.
CPC ............... *G01N 2223/076* (2013.01); *G01N 2223/1016* (2013.01); *G01N 2223/309* (2013.01); *G01N 2223/6116* (2013.01)

(56) References Cited

U.S. PATENT DOCUMENTS

| | | | |
|---|---|---|---|
| 9,829,448 B2 * | 11/2017 | Wormington | G01N 23/223 |
| 10,473,598 B2 * | 11/2019 | Ogata | G01N 23/2204 |
| 10,876,950 B2 * | 12/2020 | Mizuno | G01N 23/223 |
| 10,883,945 B2 * | 1/2021 | Fujimura | G01N 23/207 |
| 2016/0123909 A1 | 5/2016 | Wormington et al. | |
| 2017/0234814 A1 * | 8/2017 | Ogata | G01N 23/2206 378/44 |
| 2019/0017916 A1 | 1/2019 | Mizuno et al. | |
| 2020/0378908 A1 | 12/2020 | Fujimura et al. | |

FOREIGN PATENT DOCUMENTS

| | | |
|---|---|---|
| CN | 104931517 A | 9/2015 |
| CN | 105277579 A | 1/2016 |
| CN | 105628724 A | 6/2016 |
| CN | 108885186 A | 11/2018 |
| CN | 109507220 A | 3/2019 |
| EP | 3226284 A1 | 10/2017 |
| EP | 3285065 A1 | 2/2018 |
| EP | 3428630 A1 | 1/2019 |
| JP | 2009210507 A | 9/2009 |
| JP | 5027694 B2 * | 9/2012 |
| JP | 2017161276 A | 9/2017 |
| JP | 2019020411 A | 2/2019 |
| JP | 2019203694 A | 11/2019 |
| JP | 2020056776 A | 4/2020 |
| KR | 101669220 B1 * | 10/2016 |
| TW | 201621305 A | 6/2016 |
| WO | 2018100873 A1 | 6/2018 |

OTHER PUBLICATIONS

English translation of the International Search Report for PCT/JP2023/014530 with English translation, pp. 1-4.
Notice of Allowance of Mar. 5, 2024 for corresponding JP application No. 2022-095157 with English translation, pp. 1-6.
Office Action of Nov. 23, 2023 for corresponding TW application No. 112116752 with partial English translation, pp. 1-6.
Search Report of Jun. 3, 2025, for corresponding EP Patent Application No. 23823501.4, pp. 1-10.

* cited by examiner

X-RAY FLUORESCENCE SPECTROMETER

CROSS REFERENCE TO RELATED APPLICATIONS

This application is a National Stage of International Application No. PCT/JP2023/014530 filed on Apr. 10, 2023, which claims priority from Japanese Patent Application 2022-095157, filed on Jun. 13, 2022. The contents of the above document is incorporated herein by reference in its entirety.

TECHNICAL FIELD

The present invention relates to an X-ray fluorescence spectrometer that measures a thin sheet-shaped sample at a freely-selected measurement position on the sample.

BACKGROUND ART

There has been known an X-ray fluorescence spectrometer as an apparatus for measuring an element contained in a sample or a concentration of the element. For X-ray fluorescence analysis, a sample is arranged on a sample stage, and a position of the sample stage is controlled so that primary X-rays are radiated to a desired measurement position. Then, the X-ray fluorescence spectrometer analyzes, for example, an element contained in the sample based on an intensity of fluorescent X-rays that are emitted when the sample is irradiated with the primary X-rays.

When the sample is a thin sheet-shaped sample, for example, a silicon wafer, the primary X-rays that have been radiated may be transmitted through the sample. There is a fear of the fluorescent X-rays or scattered rays that are emitted from the sample stage becoming background for the fluorescent X-ray intensity to be measured, affecting a result of analysis. Further, the fluorescent X-rays or the scattered rays, which may become background, have different influences at a measurement position where the sample stage is present on a lower side of the sample and a measurement position where the sample stage is absent on the lower side of the sample. Thus, a measurement condition may be different depending on the measurement position.

For example, in Patent Literature 1 listed below, there is described a simultaneous multi-element X-ray fluorescence spectrometer. According to Patent Literature 1, even when the sample stage has a cutout portion, a background correction is performed in accordance with a measurement position so that a difference in the measurement condition depending on the measurement position is reduced.

CITATION LIST

Patent Literature

[PTL 1] JP 2017-161276 A

SUMMARY OF INVENTION

Technical Problem

In Patent Literature 1, a background intensity is measured in advance at each measurement position, and a corresponding background intensity is subtracted from the measured intensity given at each of the measurement positions in actual analysis, to thereby reduce a difference in the measurement condition depending on the measurement position. However, it is inevitable that the measured intensity will be affected depending on whether the sample stage is present a back side of the sample at the measurement position.

Further, a diameter of a semiconductor substrate such as a silicon wafer has been increased. However, in view of, for example, securing of a movable range within a limited space inside the apparatus and costs, it is desired that the sample stage be downsized as much as possible. However, when the sample is larger than the sample stage on which the sample is placed, it will result in a region where the sample stage is present on a back side of the sample and a region where the sample stage is absent on the back side of the sample.

The present disclosure has been made to solve the problems described above, and has an object to provide an X-ray fluorescence spectrometer that achieves a uniform state on a back side of a thin sheet-shaped sample so as to prevent a difference in a measurement condition depending on a measurement position.

Solution to Problem (1) An X-ray fluorescence spectrometer according to one aspect of the present disclosure includes: an X-ray source configured to radiate primary X-rays to a surface of a sheet-shaped sample; a detector configured to measure an intensity of fluorescent X-rays emitted from the sample irradiated with the primary X-rays; a sample stage on which the sample is to be placed; an analysis unit configured to perform an analysis based on the intensity of the fluorescent X-rays, which has been measured by the detector, at a plurality of measurement positions on the surface of the sample; at least one background correction cover, which has an outer edge portion with a shape extending along a part of an outer edge of the sample stage, and is arranged adjacent to an outer side of the sample stage so that a surface of the background correction cover is substantially flush with a surface of the sample stage; and a moving mechanism configured to move the sample stage so that the primary X-rays are radiated to a freely-selected measurement position on the surface of the sample. The moving mechanism moves the background correction cover based on movement of the sample stage and, when the sample stage is absent on a back side of the sample at a measurement position, moves the background correction cover so that the background correction cover is located on the back side of the sample at the measurement position.

(2) In the above-mentioned aspect of the present disclosure, the background correction cover is made of the same material as a material of the sample stage.

(3) In the above-mentioned aspect of the present disclosure, the sample stage has a holding portion with a protruding shape to be brought into abutment against a part of the sample.

(4) In the above-mentioned aspect of the present disclosure, the moving mechanism includes: a triple sun shaft to be rotationally driven; a sun arm fixed to the triple sun shaft; a double planetary shaft being rotatably supported at a rotating end portion of the sun arm; a planetary arm fixed to the double planetary shaft; and a sample shaft being rotatably supported at a rotating end portion of the planetary arm. The sample stage is fixed to the sample shaft. The background correction cover is fixed to the planetary arm.

(5) In the above-mentioned aspect of the present disclosure, the moving mechanism includes: an XY stage configured to move the sample stage in an XY plane, being parallel to the surface of the sample stage and the surface of the background correction cover, to such a position that the primary X-rays are radiated to the measurement position; and a rotary mechanism configured to rotate the background correction cover about a center of the sample stage.

(6) In the above-mentioned aspect of the present disclosure, a distance from a center to the outer edge of the sample stage is smaller than a distance from a center to an outer edge of the sample, and a distance from the center of the sample stage to an end portion of the background correction cover is larger than the distance from the center to the outer edge of the sample.

(7) In the above-mentioned aspect of the present disclosure, the analysis unit includes a correction unit configured to perform a correction by subtracting a background intensity from the measured intensity measured by the detector.

(8) In the above-mentioned aspect of the present disclosure, the sample stage has a circular shape, and the outer edge portion of the background correction cover, which has a shape extending along the part of the outer edge of the sample stage, has an arc-like shape extending along the outer edge of the sample stage having the circular shape.

(9) In the above-mentioned aspect of the present disclosure, the X-ray fluorescence spectrometer further includes a sample detecting unit configured to detect, when the sample has a circular shape with a cutout portion, a position of the cutout portion of the sample, which is arranged on an outer side of the outer edge of the sample stage.

Advantageous Effects of Invention

According to the present disclosure, the X-ray fluorescence spectrometer that achieves a uniform state on the back side of the sample so as to prevent the measurement condition from differing depending on the measurement position can be provided.

DESCRIPTION OF EMBODIMENTS

First Embodiment

Figure 1:
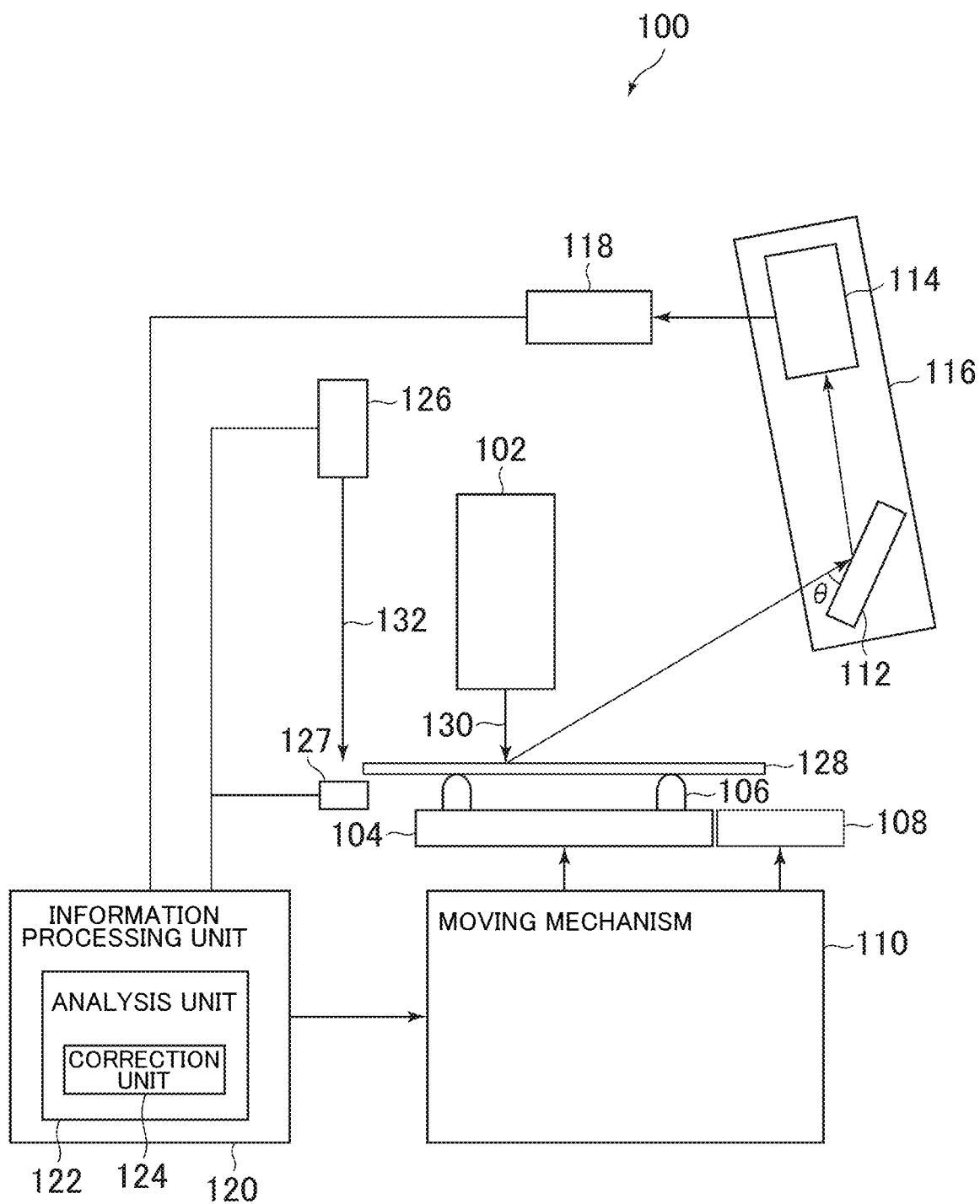
FIG. 1 is a schematic view for illustrating an example of an X-ray fluorescence spectrometer.

Now, a preferred embodiment for carrying out the present disclosure (hereinafter referred to as "embodiment") will be described. FIG. 1 is a schematic view illustrating an example of an X-ray fluorescence spectrometer 100. As illustrated in FIG. 1, the X-ray fluorescence spectrometer 100 includes an X-ray source 102, a sample stage 104, background correction covers 108, a moving mechanism 110, a spectroscopic device 112, a detector 114, a goniometer 116, a counter 118, an information processing unit 120, and a sample detecting unit.

The X-ray source 102 irradiates a surface of a sample 128 with primary X-rays 130 to cause fluorescent X-rays to be emitted from the sample 128. In this case, some of the primary X-rays 130 are transmitted through the sample 128 and reach the sample stage 104 or the background correction cover 108, which is present at a back side of the sample 128, to cause fluorescent X-rays or scattered rays to be emitted. Then, the fluorescent X-rays or the scattered rays are transmitted through the sample 128 again and are measured together with the fluorescent X-rays emitted from the sample 128 as background.

The X-ray source 102 radiates the primary X-rays 130 to a predetermined position in a sample chamber (not shown) in which the sample stage 104 and other components are arranged. The X-ray source 102 may be configured so as to be capable of changing an irradiation position. In the first embodiment, however, description is given of a case in which a position of the X-ray source 102 is fixed and in which the X-ray source 102 is configured so as to be capable of radiating the primary X-rays 130 only to a position (origin O described later) of a triple sun shaft 206 (see, for example, FIG. 2).

The sample stage 104 has the sample 128 placed thereon, and moves the sample 128 using the moving mechanism 110 so that the primary X-rays 130 are radiated to a freely-selected measurement position on a surface of the sample 128. More specifically, for example, the sample stage 104 has holding portions 106. The holding portions 106 each have a circular shape, protrude in a vertical direction from a surface of the sample stage 104, and hold the sample 128 parallel to the surface of the sample stage 104 at a distance of, for example, 10 mm from the surface of the sample stage 104. The holding portions 106 hold the sample 128 at at least three positions. The sample stage 104 may have two or more holding portions 106 each having a linear shape, a circular shape, or an arc-like shape when viewed from above and having a shape such as a projecting shape when viewed from its side. Details of the sample stage 104 will be described later.

The background correction covers 108 can be arranged adjacent to the sample stage 104 on an outer side, and each have an outer edge portion with a shape extending along a part of an outer edge of the sample stage 104. More specifically, for example, the outer edge portion of the background correction cover 108 with a shape extending along a part of the outer edge of the sample stage 104 is an arc-like portion extending along the outer edge of the sample stage 104 having a circular shape. In this embodiment, two background correction covers 108 are provided. The two background correction covers 108 are arranged by the moving mechanism 110 so that their outer edge portions each having the arc-like shape extend along the outer edge portion of the sample stage 104 having a circular shape. In this embodiment, the moving mechanism 110 that moves the background correction covers 108 and the sample stage 104 is described as one mechanism. However, the background correction covers 108 and the sample stage 104 may be moved by different mechanisms.

Further, the sample stage 104 and the background correction covers 108 are arranged so that the surface of the sample stage 104 and surfaces of the background correction covers 108 are substantially flush with each other. Thus, an influence of the fluorescent X-rays or scattered rays resulting from the primary X-rays 130 that have been transmitted through the sample 128 can be made substantially the same in a region in which the sample 128 and the sample stage 104 overlap with each other in plan view, and a region in which the sample 128 and the background correction covers 108 overlap with each other in plan view.

The term "substantially flush" means that the surfaces are located at the same height to such a degree that an influence of, for example, the scattered rays on the surface of the sample stage 104 and an influence of, for example, the scattered rays on the surfaces of the background correction covers 108 become equal to each other in terms of influences on accuracy of X-ray fluorescence analysis. Thus, when a difference in height between the surface of the sample stage 104 and the surfaces of the background correction covers 108 is small enough not to affect the accuracy of the X-ray fluorescence analysis, the surface of the sample stage 104 and the surfaces of the background correction covers 108 can be regarded as being substantially flush with each other. In order to equalize the influence of the fluorescent X-rays or the scattered rays, it is desired that the background correction covers 108 be made of the same material as a material of the sample stage 104.

The moving mechanism 110 moves an irradiation position of the primary X-rays from the X-ray source 102 or the sample stage 104 so that the primary X-rays are radiated to a freely-selected measurement position on the surface of the sample 128. Further, the moving mechanism 110 moves the background correction covers 108 based on the movement of the sample stage 104. When the sample stage 104 is absent on the back side of the sample 128 at the measurement position, the background correction covers 108 are moved so as to be located on the back side of the sample 128 at the measurement position. Details of the moving mechanism 110 will be described later.

The spectroscopic device 112 spectrally disperses fluorescent X-rays. Specifically, for example, the spectroscopic device 112 spectrally disperses fluorescent X-rays having a specific wavelength that satisfies Bragg's conditional expression among fluorescent X-rays having a plurality of wavelengths, which have been emitted from the sample 128.

The detector 114 measures an intensity of the fluorescent X-rays that have been spectrally dispersed by the spectroscopic device 112. More specifically, the detector 114 is, for example, a scintillation counter. The detector 114 measures an intensity of the fluorescent X-rays and outputs a pulse signal having a pulse height corresponding to measured energy of the fluorescent X-rays.

The spectroscopic device 112 and the detector 114 are pivoted by the goniometer 116 while maintaining a fixed angular relationship therebetween. More specifically, the spectroscopic device 112 is pivoted by the goniometer 116 so that an incident angle $\theta$ of the fluorescent X-rays with respect to a surface of the spectroscopic device 112 is varied within a predetermined range. The incident angle $\theta$ is an angle formed by a direction in which the fluorescent X-rays emitted from the sample 128 travel and the surface of the spectroscopic device 112. The fluorescent X-rays are diffracted by the spectroscopic device 112, and fluorescent X-rays that satisfy the Bragg's conditional expression (specifically, fluorescent X-rays emitted at an emission angle $\theta$) are emitted. The detector 114 is moved by the goniometer 116 to a position at which the fluorescent X-rays emitted from the spectroscopic device 112 at the emission angle $\theta$ are incident thereon.

The counter 118 counts the pulse signals output from the detector 114 based on a pulse height. More specifically, for example, the counter 118 counts the pulse signals, which are output as intensities measured by the detector 114, based on a pulse height, and outputs the pulse signals as X-ray intensities to the information processing unit 120.

The sample detecting unit detects a direction in which the sample 128 is arranged. More specifically, when the sample 128 has a cutout portion 204 and has a circular shape larger than the sample stage 104, a sample detecting unit detects a position of the cutout portion 204 of the sample 128 arranged on the sample stage 104. For example, the sample detecting unit is a transmission-type sensor such as a beam sensor, and includes a light source 126 and a light-receiving portion 127. The cutout portion 204 is, for example, a notch formed in an outer periphery of a substrate having a circular shape. The light source 126 radiates a light beam such as a laser beam 132 from above or below the sample stage 104 all along the outer edge of the sample 128. When the light beam is received by the light-receiving portion 127 that is opposed to the light source 126 across the sample 128, the position of the cutout portion 204 of the sample 128 that is arranged on the sample stage 104 is detected. In this manner, the sample detecting unit can detect the direction of the sample 128 arranged on the sample stage 104. In FIG. 1, there is illustrated an example in which the light source 126 and the light-receiving portion 127 of the sample detecting unit are arranged above and below the substrate. However, the sample detecting unit may be arranged on a side of the substrate and may be a sensor other than a beam sensor as long as the position of the cutout portion 204 can be detected.

The information processing unit 120 controls operations of the parts of the X-ray fluorescence spectrometer 100 and also analyzes the sample 128. More specifically, for example, the information processing unit 120 is a computer, and controls operations of the moving mechanism 110, the goniometer 116, and the sample detecting unit. Further, the information processing unit 120 includes an analysis unit 122. The analysis unit 122 acquires a fluorescent X-ray spectrum based on the outputs from the counter 118. Further, the analysis unit 122 analyzes elements contained in the sample 128 based on the fluorescent X-ray spectrum. In this case, the analysis unit 122 analyzes the sample 128 by using a known method such as a calibration curve method or a fundamental parameter method.

As illustrated in FIG. 1, the analysis unit 122 may include a correction unit 124. The correction unit 124 performs a correction of subtracting a background intensity from the measured intensity measured by the detector 114. More specifically, first, for example, a blank sample, which does not contain an element being a target to be analyzed, is arranged on the sample stage 104. Then, the blank sample is irradiated with the primary X-rays 130, and a measured intensity of energy generated from analyzed elements is measured. The correction unit 124 stores the measured intensity. Next, a sample to be analyzed, which contains an element being a target to be analyzed, is arranged on the sample stage 104. Then, the sample to be analyzed is irradiated with the primary X-rays 130, and a measured intensity of energy generated from analyzed elements is measured. The correction unit 124 performs a correction by subtracting the prestored measured intensity from the measured intensity described above. The correction unit 124 may perform a background correction by using other known methods.

According to the present disclosure, as will be described later, the sample stage 104 or the background correction covers 108 can be arranged on the back side of the measurement position regardless of a position of the measurement on the sample 128. Thus, after a background intensity measured at one measurement position on the blank sample is stored, the background correction can be performed at all measurement positions on the sample to be analyzed.

The wavelength-dispersive X-ray fluorescence spectrometer 100 illustrated in FIG. 1 is of a scanning type that pivots the spectroscopic device 112 and the detector 114. However, the X-ray fluorescence spectrometer 100 may also be a single-element spectrometer or a simultaneous multi-element spectrometer, in which the goniometer 116 is not used and the spectroscopic device 112 and the detector 114 are fixed. Further, the X-ray fluorescence spectrometer 100 may be of an energy-dispersive type. When the X-ray fluorescence spectrometer 100 is of an energy-dispersive type, the spectroscopic device 112 and the goniometer 116 are not included, and a semiconductor detector such as a silicon drift detector (SDD) is used as the detector 114.

Figure 2:
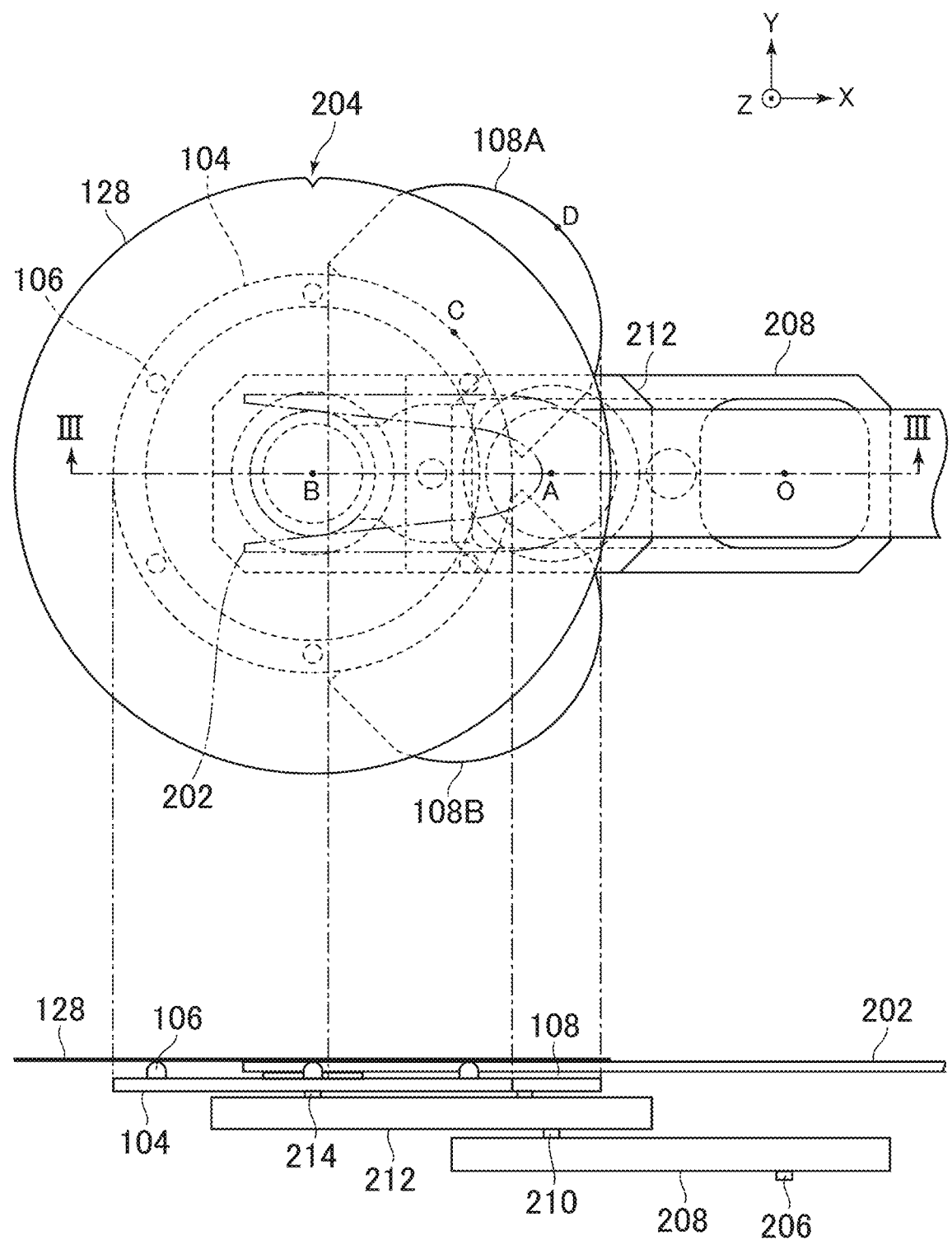
FIG. 2 is a top view and a side view for illustrating a state in which a sample that is a circular substrate is arranged on a sample stage.
Figure 3:
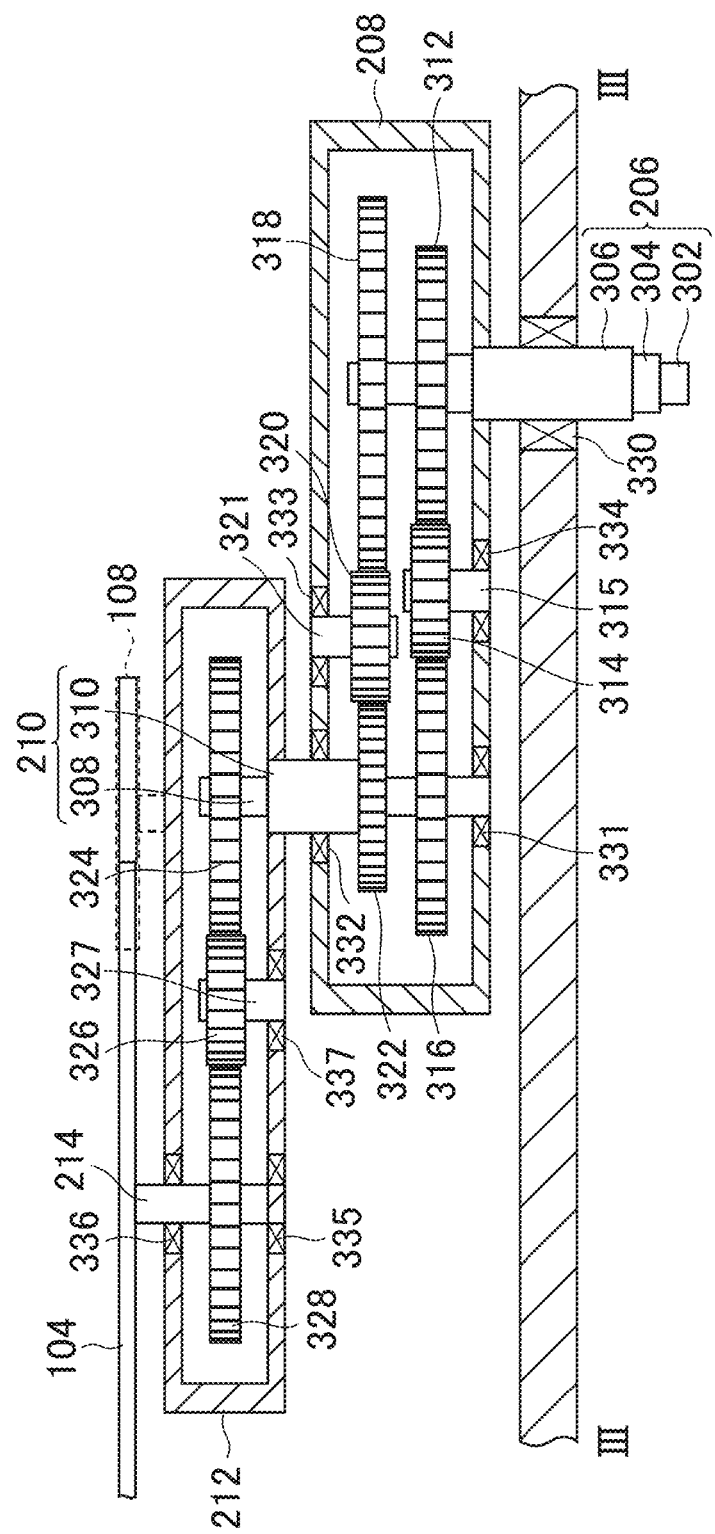
FIG. 3 is an explanatory view for illustrating a moving mechanism according to a first embodiment.

Next, details of the moving mechanism 110, the sample stage 104, the background correction covers 108, and a conveying arm 202 in the first embodiment will be described with reference to FIG. 2 and FIG. 3. FIG. 2 is a top view and a side view for illustrating a state in which the sample 128, being a circular substrate, is arranged on the sample stage 104 by the conveying arm 202. FIG. 3 is a sectional view taken along the line III-III of FIG. 2 (the conveying arm 202 and the sample 128 are not shown) for detail. The background correction covers 108 are not visible on the cross section taken along the line III-III. However, for better understanding of their positional relationship with respect to the sample stage 104, the background correction covers 108 are indicated by broken lines in FIG. 3.

The moving mechanism 110 includes the triple sun shaft 206, a sun arm 208, a double planetary shaft 210, a planetary arm 212, and a sample shaft 214. The triple sun shaft 206 is rotationally driven. The sun arm 208 is fixed to the triple sun shaft 206. The double planetary shaft 210 is rotatably supported at a rotating end portion of the sun arm 208. The planetary arm 212 is fixed to the double planetary shaft 210. The sample shaft 214 is rotatably supported at a rotating end portion of the planetary arm 212.

More specifically, the triple sun shaft 206 is a triple shaft including a first sun shaft 302, a second sun shaft 304, and a third sun shaft 306, which are rotationally driven independently of each other by drive motors (not shown). Hereinafter, a position of the triple sun shaft 206 in an XY plane (in the top view of FIG. 2, a left and right direction corresponds to an X-axis direction and a up and down direction corresponds to a Y-axis direction) that contains the surface of the sample stage 104 is set as a measurement position and also as the origin O. The sun arm 208 is a box-shaped arm that is fixed to the third sun shaft 306. The double planetary shaft 210 is a double shaft including a first planetary shaft 308 and a second planetary shaft 310. The first planetary shaft 308 is rotatably supported at the rotating end portion of the sun arm 208. The second planetary shaft 310 is provided rotatably with respect to the first planetary shaft 308. Hereinafter, a position of the double planetary shaft 210 in the XY-plane is represented by A.

A first sun gear 312, a first idler gear 314, a first planetary gear 316, a second sun gear 318, a second idler gear 320, and a second planetary gear 322 are arranged inside the sun arm 208. More specifically, the first sun gear 312 is fixed to the second sun shaft 304. The first planetary gear 316 is fixed to the first planetary shaft 308 and is rotated in association with the first sun gear 312 through intermediation of the first idler gear 314. The second sun gear 318 is fixed to the first sun shaft 302. The second planetary gear 322 is fixed to the second planetary shaft 310 and is rotated in association with the second sun gear 318 through intermediation of the second idler gear 320.

The planetary arm 212 is a box-shaped arm that is fixed to the second planetary shaft 310. A third planetary gear 324, a third idler gear 326, and a sample gear 328 are arranged inside the planetary arm 212. More specifically, the third planetary gear 324 is fixed to the first planetary shaft 308. The sample gear 328 is fixed to the sample shaft 214 and is rotated in association with the third planetary gear 324 through intermediation of the third idler gear 326.

The sample shaft 214 is rotatably supported at the rotating end portion of the planetary arm 212. Hereinafter, a position of the sample shaft 214 in the XY-plane is represented by B. Further, the first idler gear 314 and the second idler gear 320 are fixed to a first idler shaft 315 and a second idler shaft 321 that are rotatably supported by the sun arm 208, respectively. The third idler gear 326 is fixed to a third idler shaft 327 that is rotatably supported by the planetary arm 212. The sample stage 104 is fixed to the sample shaft 214, and the background correction covers 108 are fixed to the planetary arm 212.

The triple sun shaft 206 is rotatably supported on a bottom surface of the sample chamber through intermediation of a bearing 330 while maintaining airtightness of the sample chamber. Similarly, the first planetary shaft 308, the second planetary shaft 310, the first idler shaft 315, and the second idler shaft 321 are rotatably supported through intermediation of bearings 331 to 334 while maintaining airtightness of the sun arm 208 having a box shape. Similarly, the third idler shaft 327 and the sample shaft 214 are rotatably supported through intermediation of 335 to 337 bearings while maintaining airtightness of the planetary arm 212 having a box shape.

The sun arm 208, the double planetary shaft 210, the planetary arm 212, the sample shaft 214, and the sample stage 104 are arranged together with the sample 128 inside the sample chamber. The sample 128 is placed on the sample stage 104 so that a center of the sample 128 having a circular shape and a center of the sample stage 104 match each other. The moving mechanism 110 is supported only by the triple sun shaft 206, and the third shaft is rotatably supported through sun 306 intermediation of the bearing 330. Further, concentric shafts of the triple sun shaft 206, which is a triple shaft, and concentric shafts of the double planetary shaft 210, which is a double shaft, are rotatably supported while airtightness is maintained therebetween by bearings (not shown).

In the moving mechanism 110 according to the first embodiment, a distance from the triple sun shaft 206 to the double planetary shaft 210 and a distance from the double planetary shaft 210 to the sample shaft 214 are set equal to each other. Further, a gear ratio between the first sun gear 312 and the first planetary gear 316 is set to 1:1. A gear ratio between the second sun gear 318 and the second planetary gear 322 is set to 2:1. A gear ratio between the third planetary gear 324 and the sample gear 328 is set to 1:1.

The sample stage 104 has a circular shape and has six holding portions 106. More specifically, for example, the sample stage 104 has a circular shape with a radius of 100 mm and has six holding portions 106 in the vicinity of the outer edge of the sample stage 104 having a circular shape. The six holding portions 106 are arranged equally at intervals of 60 degrees. Each of the holding portions 106 has a protruding shape extending in the vertical direction from the surface of the sample stage 104. Tops of the holding portions 106 are brought into abutment against a back surface of the sample 128, to thereby hold the sample 128. Further, an electrostatic chuck may be provided in a center portion of the sample stage 104 so as to attract and hold the sample 128.

The background correction covers 108 may be arranged adjacent to the sample stage 104 on the outer side. The background correction covers 108 each have an outer edge portion with a shape extending along a part of the outer edge of the sample stage 104. More specifically, each of the background correction covers 108 has a substantially semilunar shape and has an arc-shaped outer edge portion (inner-side outer edge portion adjacent to the sample stage 104) extending along a part of the outer edge of the sample stage 104 having a circular shape and an arc-shaped outer edge portion (outer-side outer edge portion) on the opposite side. In this embodiment, the background correction covers 108 include a background correction cover 108A and a background correction cover 108B. Hereinafter, a center portion of the inner-side outer edge portion of the background correction cover 108A, which is adjacent to the sample stage 104, is represented by C, and a center portion of the outer-side outer edge portion thereof is represented by D.

The background correction cover 108A is fixed to the planetary arm 212 so that a position of a line segment BC corresponds to a position of a line segment AB rotated counterclockwise by 45 degrees about the position B. The line segment AB is a center line of the planetary arm 212 in its longitudinal direction, and the line segment BC is a line that connects the center portion C of the inner-side outer edge portion of the background correction cover 108A and the position B of the sample shaft 214 to each other (center line of the background correction cover 108A). The background correction cover 108B is fixed to the planetary arm 212 so that its position is symmetric to a position of the background correction cover 108A with respect to the line segment AB serving as a line of symmetry. Specifically, the background correction cover 108B is fixed at a position of the background correction cover 108A rotated clockwise by 90 degrees about the position B. Further, the background correction covers 108 are fixed to the planetary arm 212 so that a distance between the center portion C of the inner-side outer edge portion of the background correction cover 108A and the position B of the sample shaft 214 becomes substantially equal to the radius of the sample stage 104. Further, a distance between the center portion C of the inner-side outer edge portion and the center portion D of the outer-side outer edge portion of the background correction cover 108A is set so as to be larger than a difference between a radius of the sample 128 and the radius of the sample stage 104. Further, the background correction cover 108A and the background correction cover 108B have the same shape.

With the background correction covers 108 described above, even when a distance from the center of the sample stage 104 to its outer edge is smaller than a distance from the center of the sample 128 to its outer edge, a measurement can be performed under an environment in which the state of the back side of the sample 128 immediately below the measurement position of the sample 128 is uniform regardless of the measurement position as long as a difference between the above-mentioned distances is smaller than a length of a line segment CD. Specifically, a uniform environment can be achieved on the back side of the sample 128 by setting the distance from the position B of the sample shaft 214 (the center of the sample stage 104) to the center portion D of the outer-side outer edge portion of the background correction cover 108A larger than the distance from the center of the sample 128 to its outer edge (radius of the sample 128). For example, even for the sample 128 that is larger than the sample stage 104, when the radius of the sample stage 104 is set to 100 mm and the distance CD is set to 80 mm, the present disclosure can be applied to the sample 128 having a circular shape and a radius up to 180 mm.

The conveying arm 202 conveys the sample 128. More specifically, for example, the conveying arm 202 conveys the sample 128 between a load lock (not shown) and the sample chamber (not shown) in which the sample stage 104 is arranged. When the sample 128 is to be conveyed onto the sample stage 104, the conveying arm 202 moves the sample 128 from the right side toward the left side in FIG. 2 while carrying the sample 128 thereon so that the center of the sample 128 having a circular shape and the center of the sample stage 104 are aligned with each other when viewed from above. During this movement, the conveying arm 202 moves above (in a Z-axis direction) the surface of the sample stage 104 having a circular shape. After moving the sample 128 so that the center of the sample 128 having a circular shape and the center of the sample stage 104 are aligned with each other, the conveying arm 202 is moved downward in the vertical direction (−Z-axis direction) to allow the sample 128 to be held by the holding portions 106. Further, the conveying arm 202 is moved through a gap defined by the holding portions 106 (space between the back surface of the sample 128 and the surface of the sample stage 104) from the left side toward the right side in FIG. 2. Through the above-mentioned procedure, the sample 128 is conveyed from the load lock onto the sample stage 104. When the sample 128 is to be conveyed from the sample stage 104 into the load lock, a reverse procedure to the above-mentioned procedure is carried out.

As described above, the gap defined by the holding portions 106 enables the conveying arm 202 to convey the sample 128 between the load lock and the sample chamber in a non-contact manner with the surface of the sample 128. A conveying method is not limited to the above-mentioned one and may be other methods. For example, the conveying arm 202 may attract the surface of the sample 128 so as to convey the sample 128 between the load lock and the sample chamber. With this configuration, the holding portions 106 provided to the sample stage 104 can be omitted.

Next, an operation of the moving mechanism 110 will be described. First, consideration is given to a case in which rotation of the second sun gear 318 with respect to a coordinate system X-Y is fixed by fixing rotation of the drive motor (not shown) that rotationally drives the first sun shaft 302 while the drive motor that rotationally drives the third sun shaft 306 is rotated. In this case, the distance from the triple sun shaft 206 to the double planetary shaft 210 and the distance from the double planetary shaft 210 to the sample shaft 214 are set equal to each other. Thus, the center of the sample stage 104 can be moved from an X-coordinate 2d to −2d on an X axis (first principle). A value 2d is a sum of a distance OA from the triple sun shaft 206 to the double planetary shaft 210 and a distance AB from the double planetary shaft 210 to the sample shaft 214.

Next, consideration is given to a case in which the first sun shaft 302 and the third sun shaft 306 are rotationally driven in the same direction by the same angle, specifically, the second sun gear 318 and the sun arm 208 are rotated integrally. In this case, the sample stage 104 revolves about the origin O while the angle defined by the sun arm 208 and the planetary arm 212 is maintained, specifically, a revolution radius of the sample stage 104 is maintained (second principle). Based on the first and second principles, the center of the sample stage 104 can be located at an appropriate position inside a circle that has the origin as a center and a radius of 2d.

Next, consideration is given to a case in which rotation of the first sun gear 312 with respect to the coordinate system X-Y is fixed by fixing rotation of the drive motor that rotationally drives the second sun shaft 304 while the sun arm 208 and the planetary arm 212 are rotated integrally based on the second principle. In this case, the first sun gear 312 and the first planetary gear 316 have the gear ratio of 1:1. Thus, directions of the first planetary gear 316 and the third planetary gear 324 in the coordinate system X-Y are maintained. Similarly, a direction of the sample gear 328, which is operated in association with the third planetary gear 324 through intermediation of the third idler gear 326, and a direction of the sample stage 104 are also maintained in the coordinate system X-Y. This means that the fixing of the second sun shaft 304 allows the direction of the sample stage 104 in the coordinate system X-Y to be maintained even when the sample stage 104 is caused to revolve about the origin based on the second principle. Specifically, the direction of the sample stage 104 can be determined appropriately regardless of the position of the sample stage 104 in the coordinate system X-Y while the position of the sample stage 104 is maintained (third principle).

According to the first to third principles, when the sample 128 has a radius of 2d or less, the sample 128 can be moved so that a freely-selected measurement position on the sample matches the irradiation position of the primary X-rays 130.

Next, with reference to FIG. 4A to FIG. 6D, a positional relationship among the moving mechanism 110, the sample stage 104, and the background correction covers 108 for each measurement position will be described. In the following description, a measurement position ("r" mm, θ degrees) is a position that is "r" mm away from the center of the sample 128 and rotated clockwise by θ degrees from 0 degrees set in a rightward direction in FIG. 4A to FIG. 6D. Specifically, a position (r mm, θ degrees) is a relative position with respect to the center of the sample 128 that is moved together with the sample stage 104. Meanwhile, the origin O is an absolute fixed position (specifically, a fixed position inside the sample chamber (not shown) in which the sample stage 104 and other components are arranged) and is a measurement position to which the primary X-rays are radiated. Thus, all the positions O in FIG. 4A to FIG. 6D are the same position inside the sample chamber. Further, a state illustrated in FIG. 2 is referred to as an initial state. Specifically, in the initial state, a center line OA of the sun arm 208 and a center line AB of the planetary arm 212 in its longitudinal direction are located on the X axis, a position of the triple sun shaft 206 is represented by coordinates (−2d, 0) on the XY plane, and a center line CD of the background correction cover 108A is located at a position rotated counterclockwise by 45 degrees from the X axis. Further, it is assumed that the sample 128 is arranged so that the cutout portion 204 is located in the Y-axis direction under the initial state.

Figure 4A:
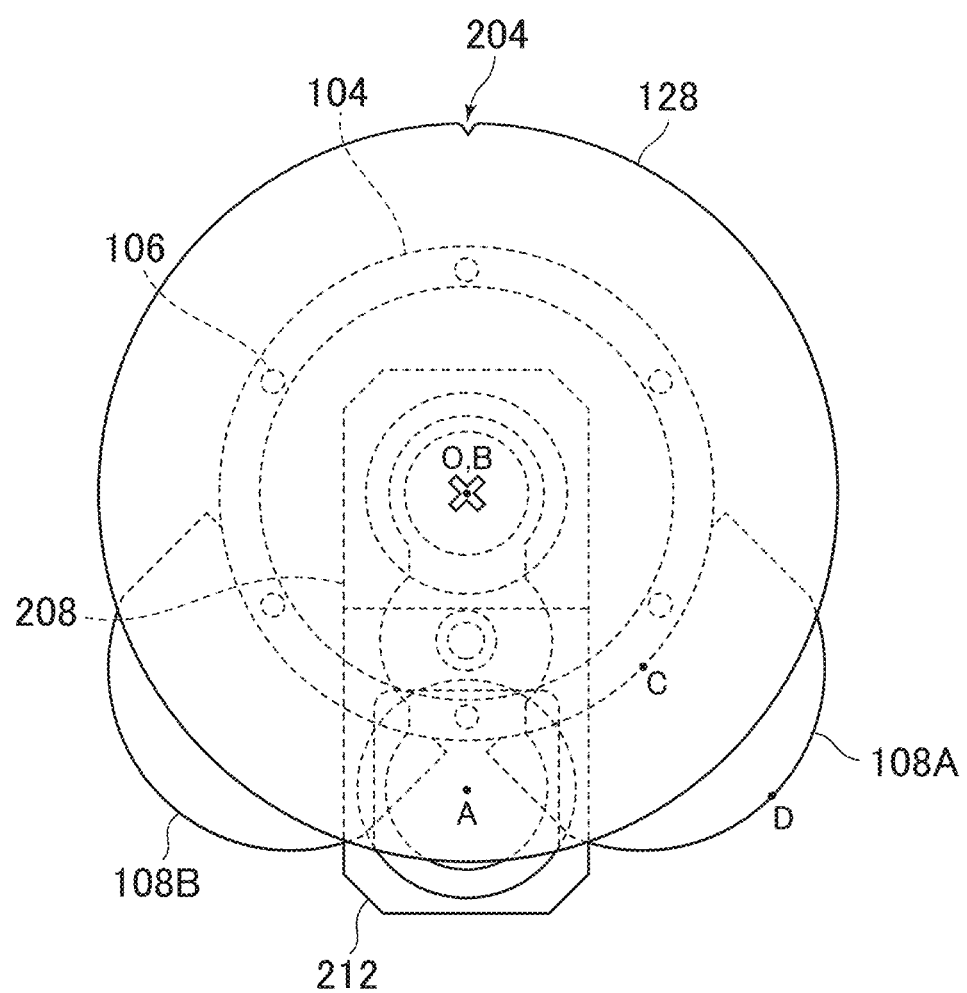
FIG. 4A is a view for illustrating a positional relationship among the moving mechanism, the sample stage, and background correction covers when a measurement position is at (0 mm, 0 degrees).

FIG. 4A to FIG. 4D are views for illustrating the positional relationship among the moving mechanism 110, the sample stage 104, and the background correction covers 108 when θ is fixed to 0 degrees and "r" is changed to 0 mm, 75 mm, 100 mm, and 150 mm, respectively. As illustrated in FIG. 4A, when a measurement position is at (0 mm, 0 degrees) (specifically, at the center of the sample 128), the moving mechanism 110 moves the sample 128 so that the center of the sample 128 is located at the origin O to which the primary X-rays 130 are radiated. Thus, the moving mechanism 110 moves the sample 128 so that the position B of the sample shaft 214 matches the origin O. In this state, the center line OA of the sun arm 208 and the center line AB of the planetary arm 212 in its longitudinal direction are located on a Y axis. Further, the background correction cover 108A and the background correction cover 108B are fixed to the planetary arm 212 so as to have the above-mentioned positional relationship. Thus, the background correction cover 108A is arranged (on a lower right side of the position B in FIG. 4A) so that the position of the line segment BC corresponds to a position of the line segment AB rotated counterclockwise by 45 degrees about the position B. Further, the background correction cover 108B is arranged (on a lower left side of the position B in FIG. 4A) at a position to which the background correction cover 108A is rotated clockwise by 90 degrees about the position B. In a state illustrated in FIG. 4A, the sample stage 104 is present on the back side of the sample 128 at the measurement position (0 mm, 0 degrees).

Figure 4B:
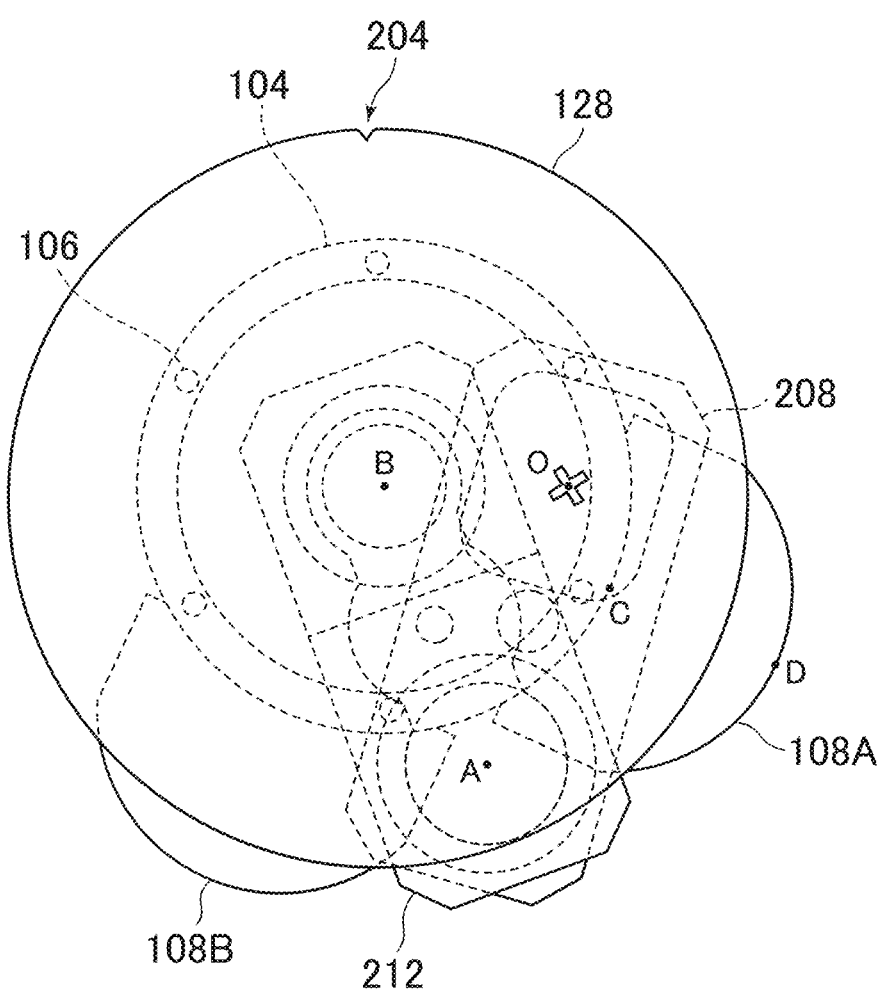
FIG. 4B is a view for illustrating a positional relationship among the moving mechanism, the sample stage, and the background correction covers when the measurement position is at (75 mm, 0 degrees).
Figure 4C:
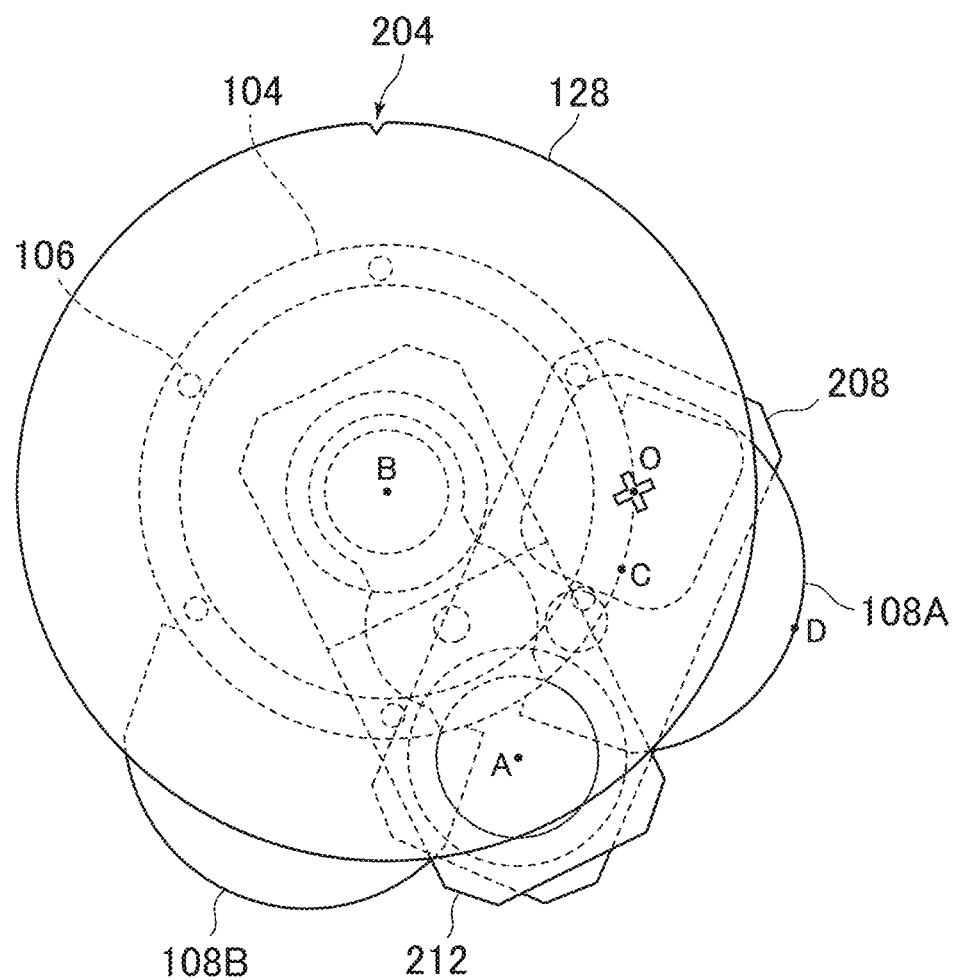
FIG. 4C is a view for illustrating a positional relationship among the moving mechanism, the sample stage, and the background correction covers when the measurement position is at (100 mm, 0 degrees).
Figure 4D:
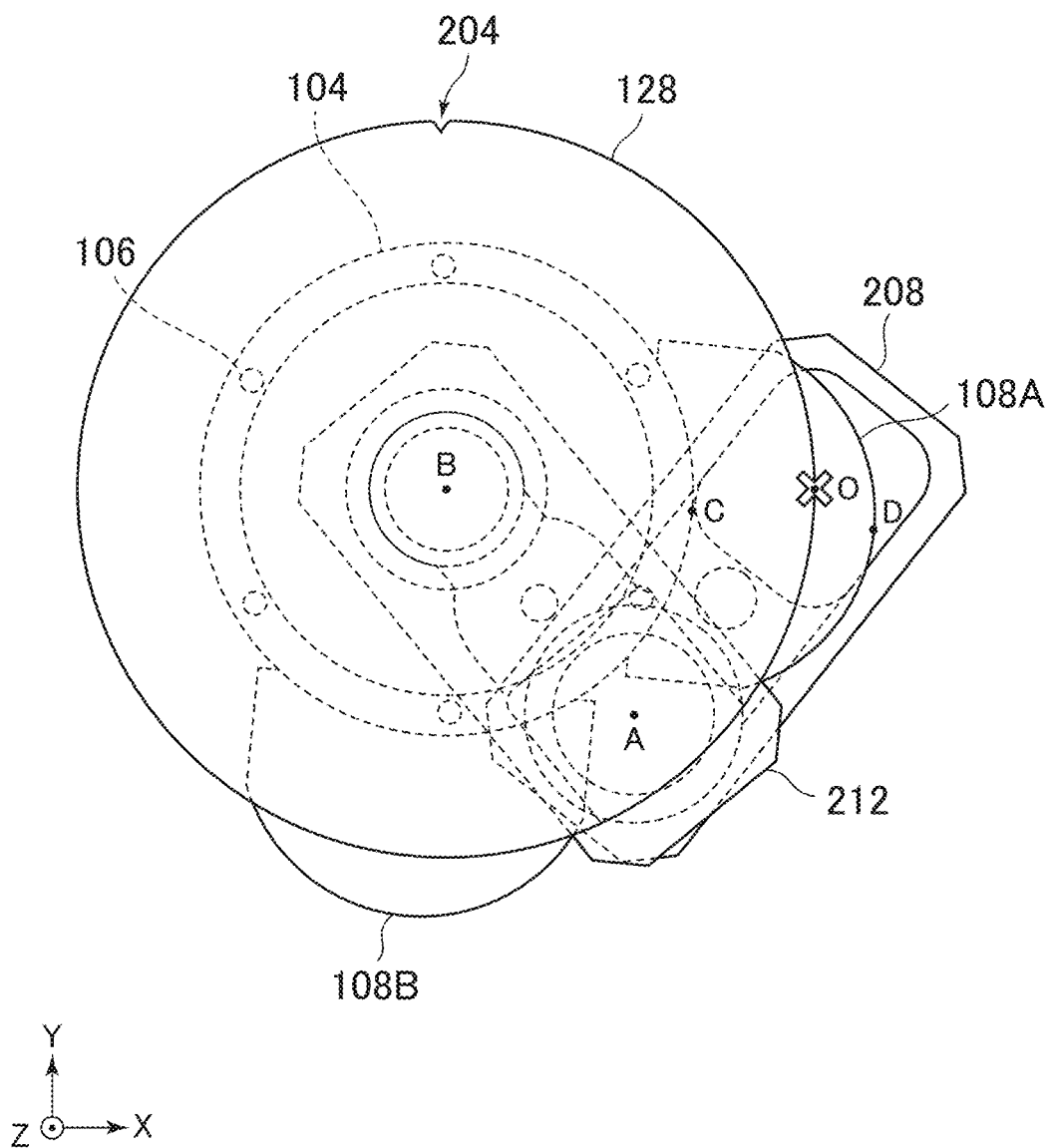
FIG. 4D is a view for illustrating a positional relationship among the moving mechanism, the sample stage, and the background correction covers when the measurement position is at (150 mm, 0 degrees).

As illustrated in FIG. 4B to FIG. 4D, when the measurement position (position O) is located at (75 mm, 0 degrees), (100 mm, 0 degrees), and (150 mm, 0 degrees), the moving mechanism 110 moves the sample 128 so that the measurement position on the sample 128 is located at the origin O to which the first X-rays 130 are radiated. Specifically, the sun arm 208 is rotated clockwise from a state illustrated in FIG. 4A, and the planetary arm 212 is rotated counterclockwise from the state illustrated in FIG. 4A. As a result, the sample stage 104 is moved to the positions at which the distance between O and B becomes equal to 75 mm, 100 mm, and 150 mm. As described above, the position O is a fixed position inside the sample chamber (not shown). Thus, the sample stage 104 illustrated in FIG. 4B to FIG. 4D is moved from the position of the sample stage 104 illustrated in FIG. 4A to the left side (in a −X-axis direction) in FIG. 4B to FIG. 4D. Further, the background correction cover 108A and the background correction cover 108B are fixed to the planetary arm 212 as described above, and thus are moved while maintaining a positional relationship with respect to the planetary arm 212. In states illustrated in FIG. 4B and FIG. 4C, the sample stage 104 is present on the back side of the sample 128 at the position (75 mm, 0 degrees) and at the position (100 mm, 0 degrees). Meanwhile, in a state illustrated in FIG. 4D, the background correction cover 108A is present on the back side of the sample 128 at the measurement position (150 mm, 0 degrees).

Figure 5A:
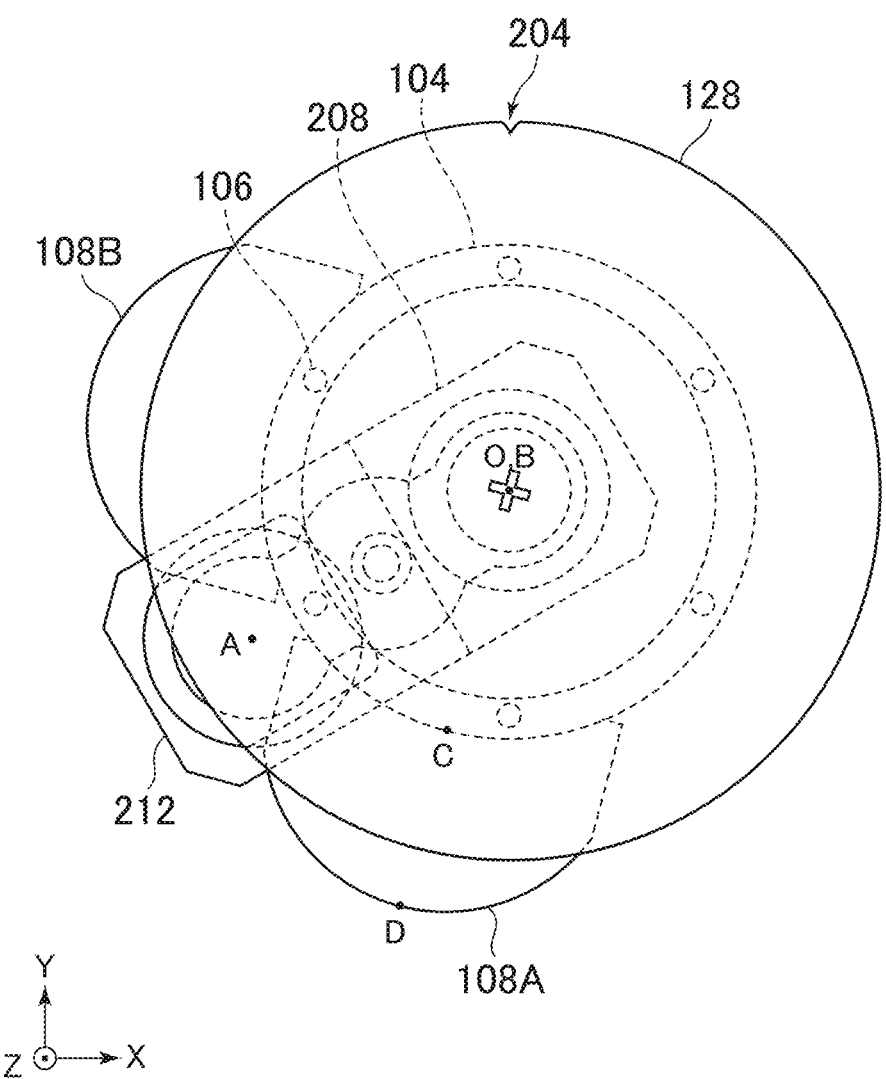
FIG. 5A is a view for illustrating a positional relationship among the moving mechanism, the sample stage, and the background correction covers when the measurement position is at (0 mm, 60 degrees).

FIG. 5A to FIG. 5D are views illustrating the positional relationship among the moving mechanism 110, the sample stage 104, and the background correction covers 108 when θ is fixed to 60 degrees and "r" is changed to 0 mm, 75 mm, 100 mm, and 150 mm, respectively. As illustrated in FIG. 5A, when a measurement position is at (0 mm, 60 degrees) (specifically, at the center of the sample 128), the moving mechanism 110 moves the sample 128 so that the center of the sample 128 is located at the origin O to which the primary X-rays 130 are radiated. Thus, the moving mechanism 110 moves the sample 128 so that the position B of the sample shaft 214 matches the origin O. In this state, the center line OA of the sun arm 208 and the center line AB of the planetary arm 212 in its longitudinal direction are located at a position rotated clockwise from the Y axis by 60 degrees about the position O. Further, the background correction cover 108A is arranged so that a position of the line segment BC corresponds to a position of the line segment AB rotated counterclockwise by 45 degrees about the position B. The background correction cover 108B is arranged so that its position corresponds to a position of the background correction cover 108A rotated by 90 degrees about the position B. In a state illustrated in FIG. 5A, the sample stage 104 is present on the back side of the sample 128 at the measurement position (0 mm, 60 degrees).

Figure 5B:
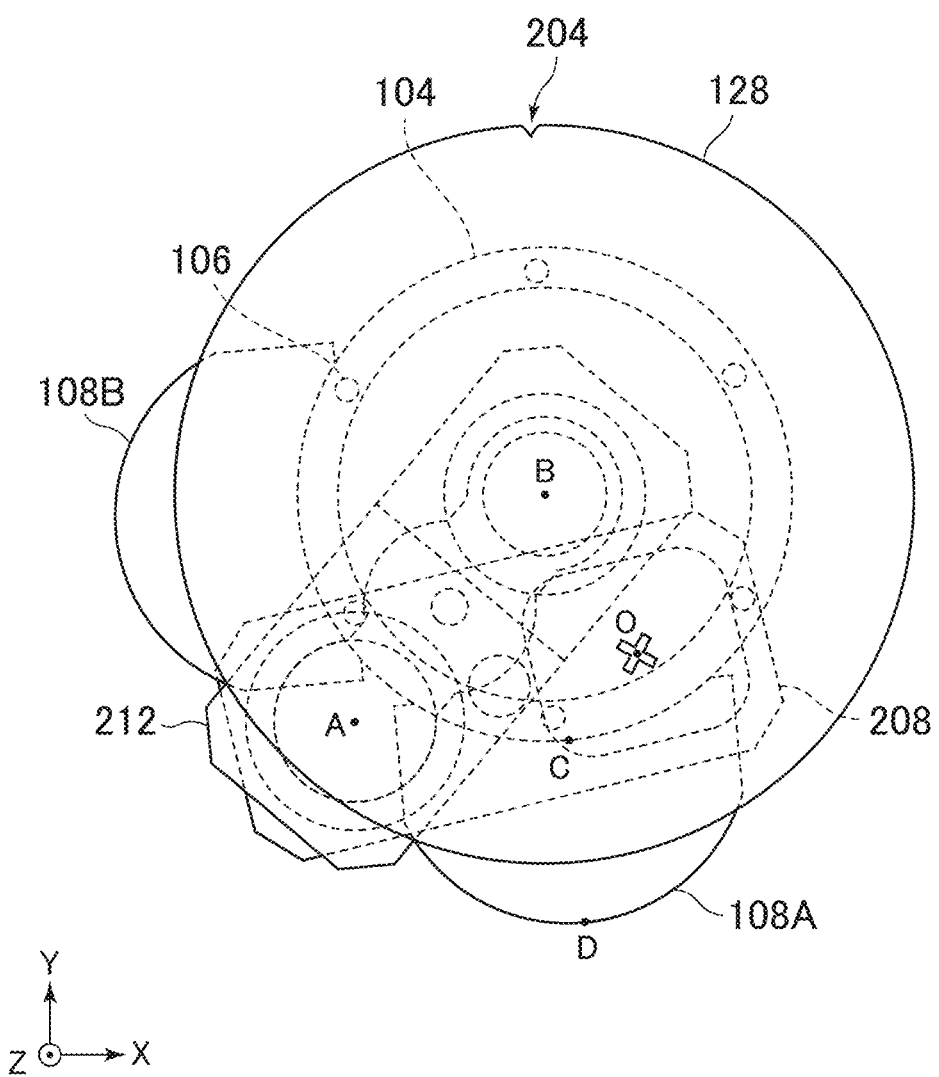
FIG. 5B is a view for illustrating a positional relationship among the moving mechanism, the sample stage, and the background correction covers when the measurement position is at (75 mm, 60 degrees).
Figure 5C:
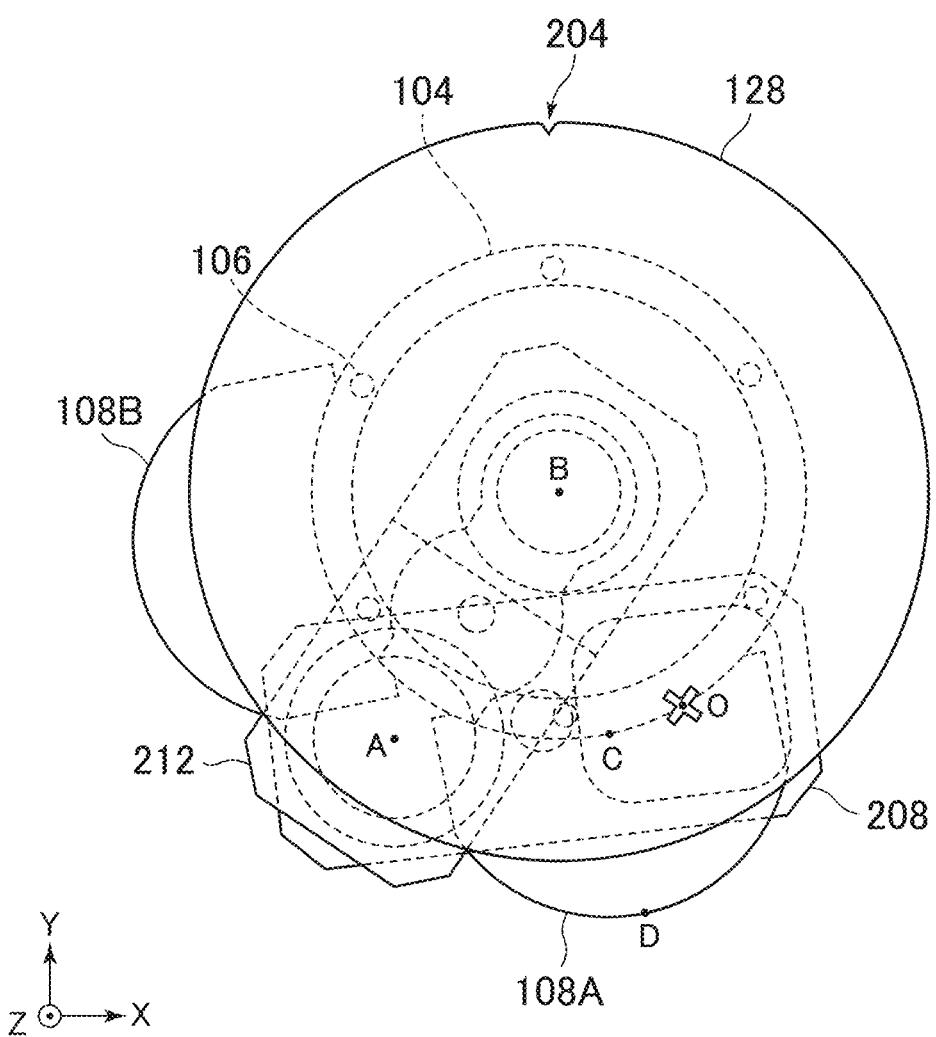
FIG. 5C is a view for illustrating a positional relationship among the moving mechanism, the sample stage, and the background correction covers when the measurement position is at (100 mm, 60 degrees).
Figure 5D:
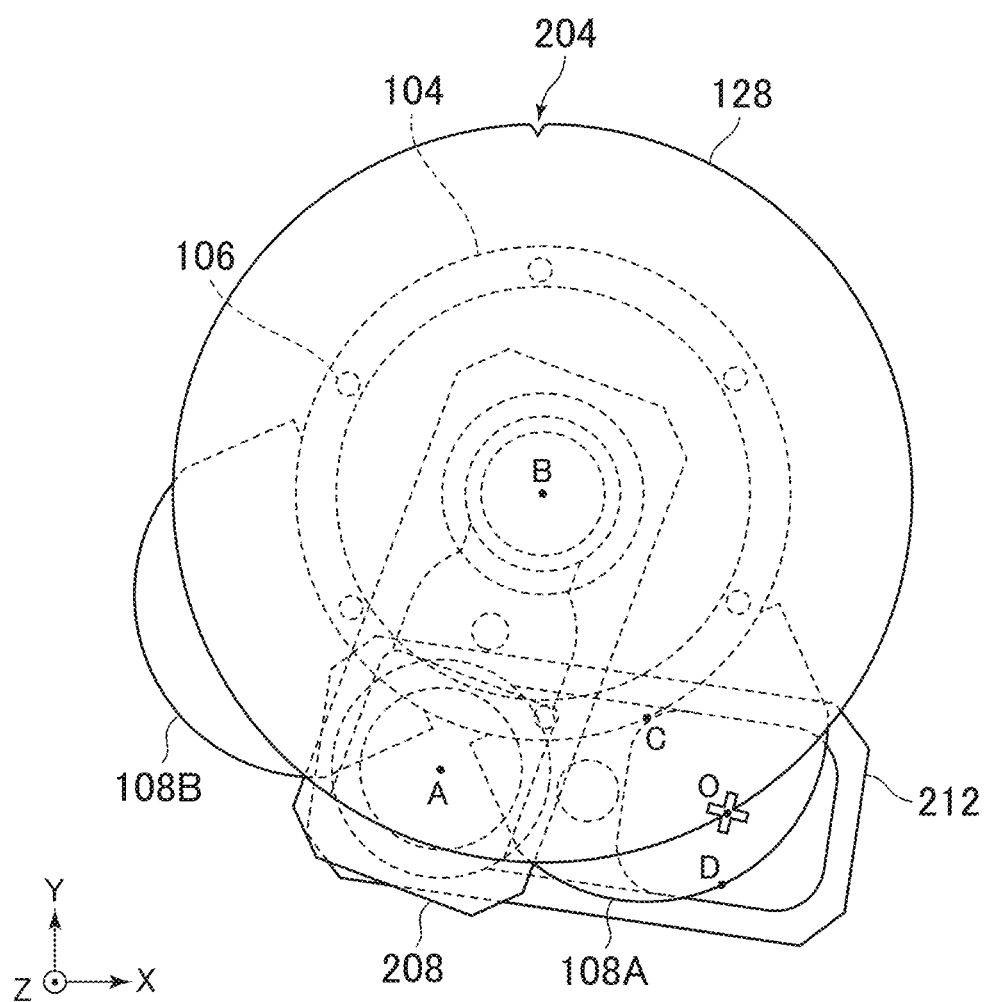
FIG. 5D is a view for illustrating a positional relationship among the moving mechanism, the sample stage, and the background correction covers when the measurement position is at (150 mm, 60 degrees).

As illustrated in FIG. 5B to FIG. 5D, when the measurement position is located at (75 mm, 60 degrees), (100 mm, 60 degrees), and (150 mm, 60 degrees), the moving mechanism 110 moves the sample 128 so that the measurement position on the sample 128 is located at the origin O to which the first X-rays 130 are radiated. Specifically, the sun arm 208 is rotated clockwise from a state illustrated in FIG. 5A, and the planetary arm 212 is rotated counterclockwise from the state illustrated in FIG. 5A. As a result, the sample stage 104 is moved to the positions at which the distance between O and B becomes equal to 75 mm, 100 mm, and 150 mm. As described above, the position O is a fixed position inside the sample chamber (not shown). Thus, the sample stage 104 illustrated in FIG. 5B to FIG. 5D is moved from the position of the sample stage 104 illustrated in FIG. 5A to the upper left side (in a −X-axis direction and Y-axis direction) in FIG. 5B to FIG. 5D. Further, the background correction cover 108A and the background correction cover 108B are fixed to the planetary arm 212 as described above, and thus are moved while maintaining a positional relationship with respect to the planetary arm 212. In states illustrated in FIG. 5B and FIG. 5C, the sample stage 104 is present on the back side of the sample 128 at the position (75 mm, 60 degrees) and at the position (100 mm, 60 degrees). Meanwhile, in a state illustrated in FIG. 5D, the background correction cover 108A is present on the back side of the sample 128 at the measurement position (150 mm, 60 degrees).

Figure 6A:
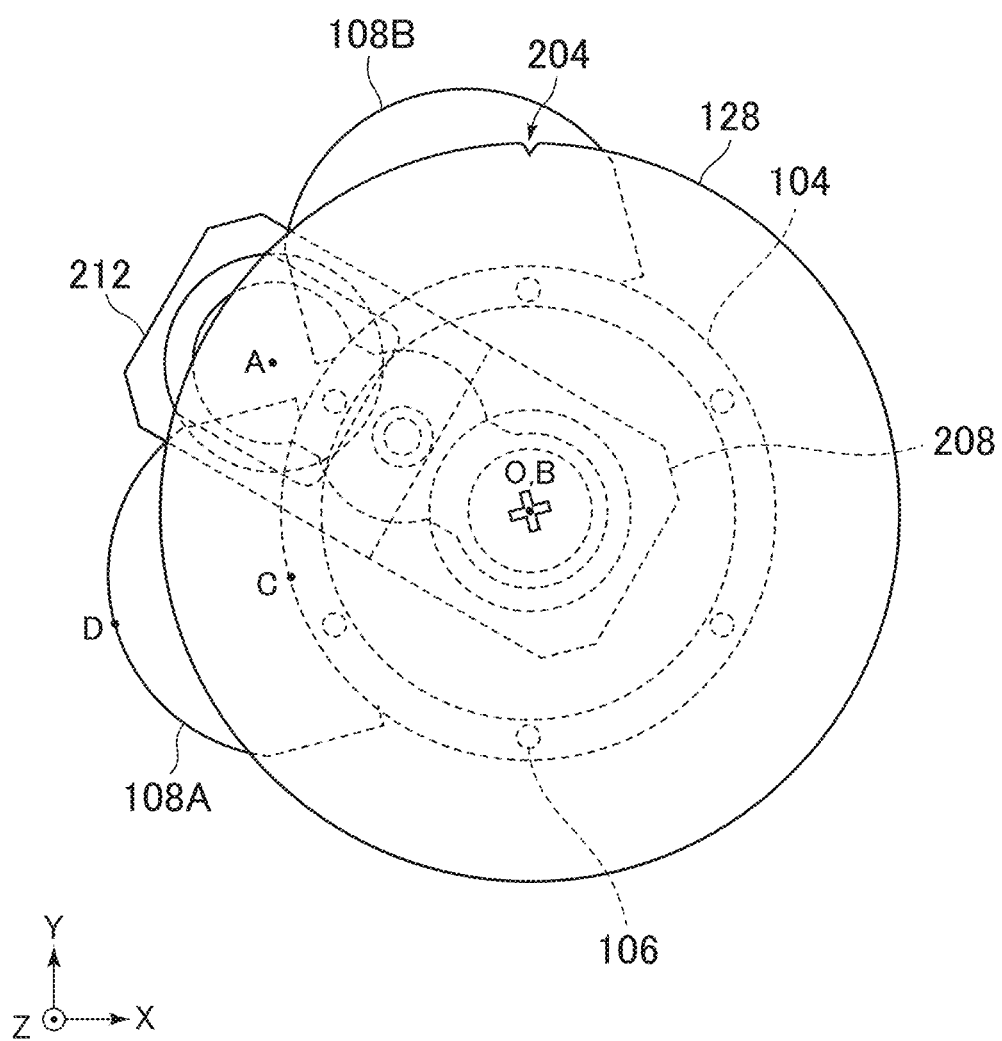
FIG. 6A is a view for illustrating a positional relationship among the moving mechanism, the sample stage, and the background correction covers when the measurement position is at (0 mm, −60 degrees).

FIG. 6A to FIG. 6D are views illustrating the positional relationship among the moving mechanism 110, the sample stage 104, and the background correction covers 108 when θ is fixed to −60 degrees and "r" is changed to 0 mm, 75 mm, 100 mm, and 150 mm, respectively. As illustrated in FIG. 6A, when a measurement position is at (0 mm, −60 degrees) (specifically, at the center of the sample 128), the moving mechanism 110 moves the sample 128 so that the center of the sample 128 is located at the origin O to which the primary X-rays 130 are radiated. Thus, the moving mechanism 110 moves the sample 128 so that the position B of the sample shaft 214 matches the origin O. In this state, the center line OA of the sun arm 208 and the center line AB of the planetary arm 212 in its longitudinal direction are located at a position rotated counterclockwise from the Y axis by 60 degrees about the position O. Further, the background correction cover 108A is arranged so that a position of the line segment BC corresponds to a position of the line segment AB rotated counterclockwise by 45 degrees about the position B. The background correction cover 108B is arranged so that its position corresponds to a position of the background correction cover 108A rotated by 90 degrees about the position B. In a state illustrated in FIG. 6A, the sample stage 104 is present on the back side of the sample 128 at the measurement position (0 mm, −60 degrees).

Figure 6B:
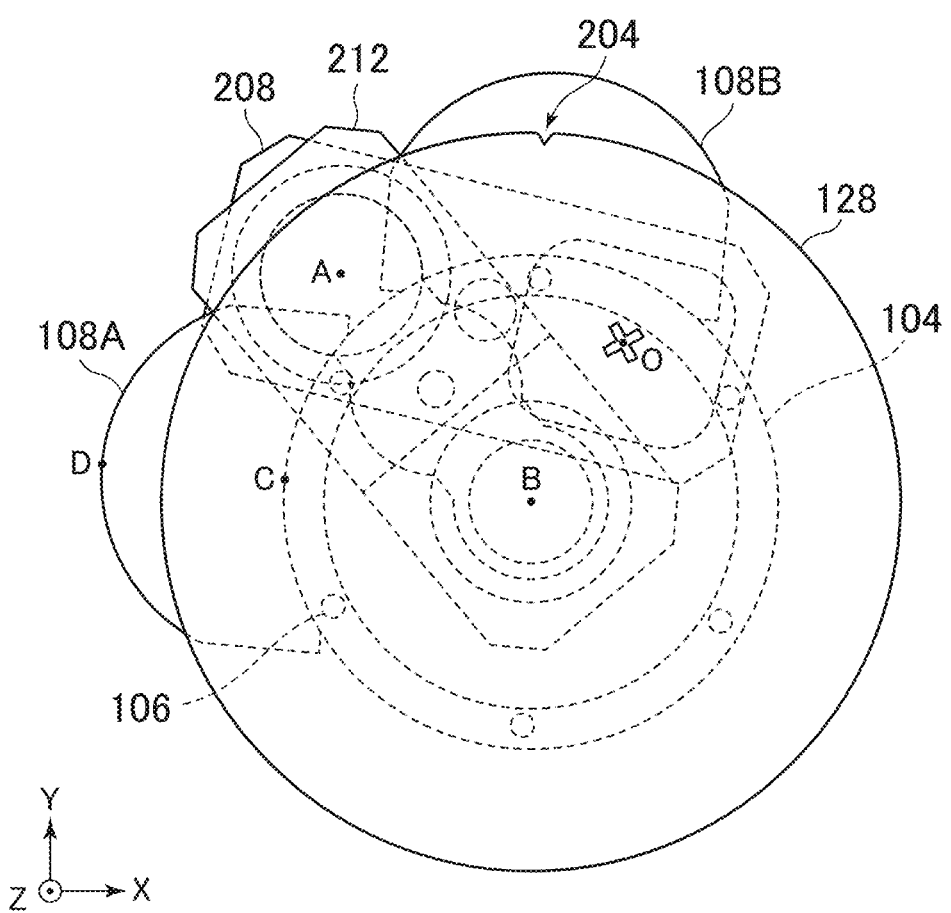
FIG. 6B is a view for illustrating a positional relationship among the moving mechanism, the sample stage, and the background correction covers when the measurement position is at (75 mm, −60 degrees).
Figure 6C:
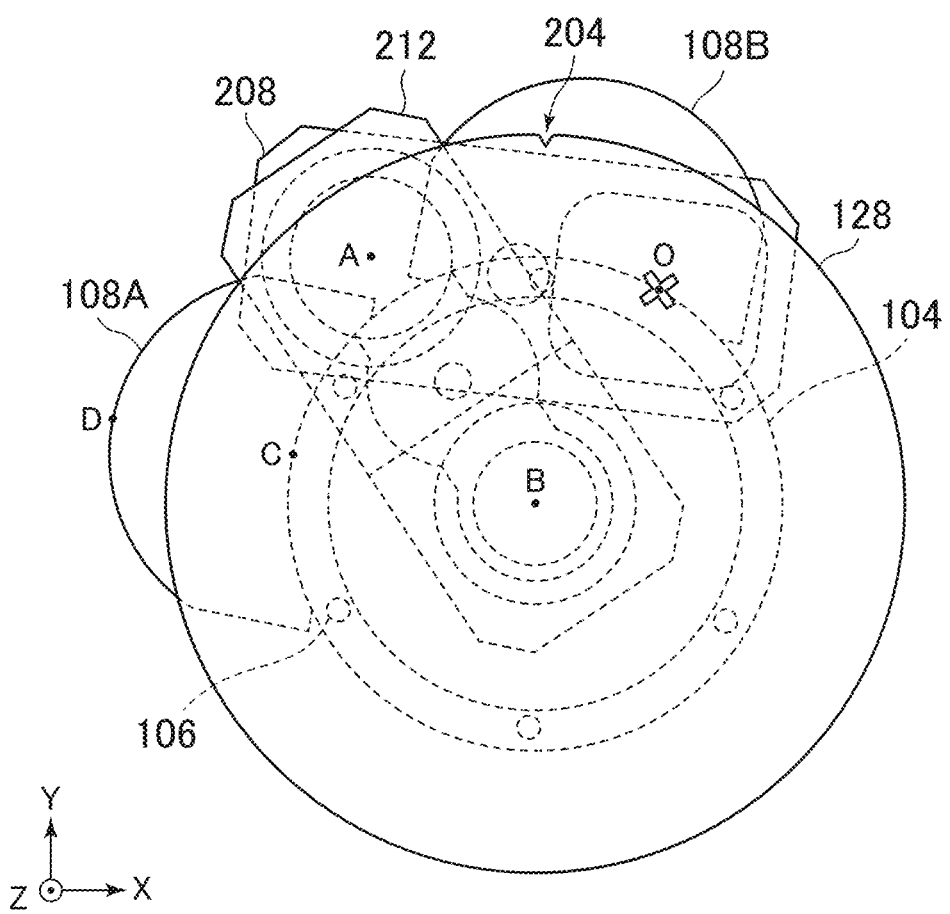
FIG. 6C is a view for illustrating a positional relationship among the moving mechanism, the sample stage, and the background correction covers when the measurement position is at (100 mm, −60 degrees).
Figure 6D:
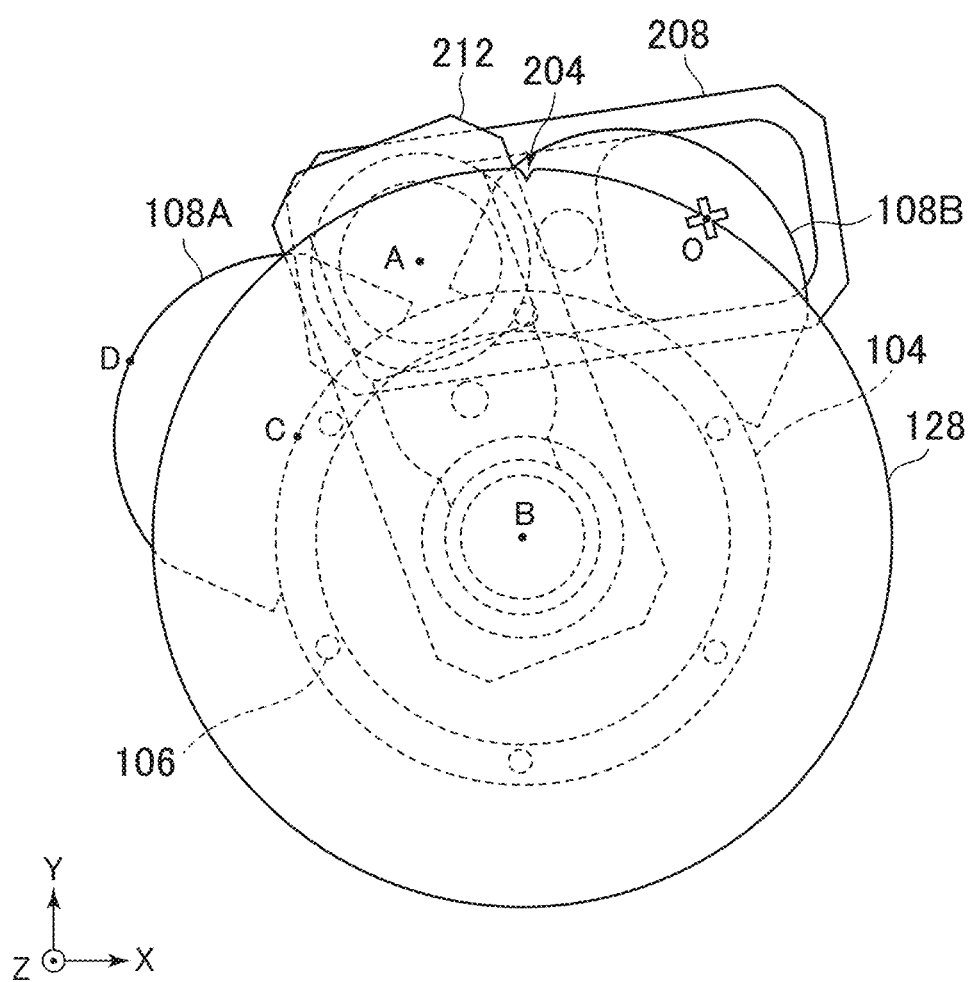
FIG. 6D is a view for illustrating a positional relationship among the moving mechanism, the sample stage, and the background correction covers when the measurement position is at (150 mm, −60 degrees).

As illustrated in FIG. 6B to FIG. 6D, when the measurement position is located at (75 mm, −60 degrees), (100 mm, −60 degrees), and (150 mm, −60 degrees), the moving mechanism 110 moves the sample 128 so that the measurement position on the sample 128 is located at the origin O to which the first X-rays 130 are radiated. Specifically, the sun arm 208 is rotated counterclockwise from a state illustrated in FIG. 6A, and the planetary arm 212 is rotated clockwise from the state illustrated in FIG. 6A. As a result, the sample stage 104 is moved to the positions at which the distance between 0 and B becomes equal to 75 mm, 100 mm, and 150 mm. As described above, the position O is a fixed position inside the sample chamber (not shown). Thus, the sample stage 104 illustrated in FIG. 6B to FIG. 6D is moved from the position of the sample stage 104 illustrated in FIG. 6A to the lower left side (in a −X-axis direction and −Y-axis direction) in FIG. 6B to FIG. 6D. Further, the background correction cover 108A and the background correction cover 108B are fixed to the planetary arm 212 as described above, and thus are moved while maintaining a positional relationship with respect to the planetary arm 212. In states illustrated in FIG. 6B and FIG. 6C, the sample stage 104 is present on the back side of the sample 128 at the position (75 mm, 60 degrees) and at the position (100 mm, 60 degrees). Meanwhile, in a state illustrated in FIG. 6D, the background correction cover 108B is present on the back side of the sample 128 at the measurement position (150 mm, 60 degrees).

As described above, when two background correction covers 108 are fixed to the planetary arm 212, the background correction covers 108 can be moved and arranged at predetermined positions with small movement of the arms.

As described above, any one of the sample stage 104, the background correction cover 108A, and the background correction cover 108B is arranged on the back side of the measurement position illustrated in FIG. 4A to FIG. 6D. Further, even when a position other than the measurement position illustrated in FIG. 4A to FIG. 6D is set as a measurement position, the sample 128 can be moved so that a freely-selected measurement position on the sample 128 is located at the position of the triple sun shaft 206 to which the primary X-rays 130 are radiated, and the sample stage 104 or the background correction covers 108 can be arranged on the back side of the measurement position based on the first to third principles described above. Accordingly, a uniform environment is achieved on the back side of the sample 128 immediately below the measurement position, and thus the measurement condition can be prevented from differing depending on where the measurement position is set.

Description has been given for the embodiment in which two background correction covers 108 are provided. However, one background correction cover 108 may be provided as long as any one of the sample stage 104 and the background correction cover 108 is present on the back side of the measurement position.

Second Embodiment

Next, a second embodiment will be described. The second embodiment is different from the first embodiment only in a configuration of a moving mechanism 110. Other configurations of the second embodiment are the same as those of the first embodiment, and thus description thereof is omitted.

Figure 7:
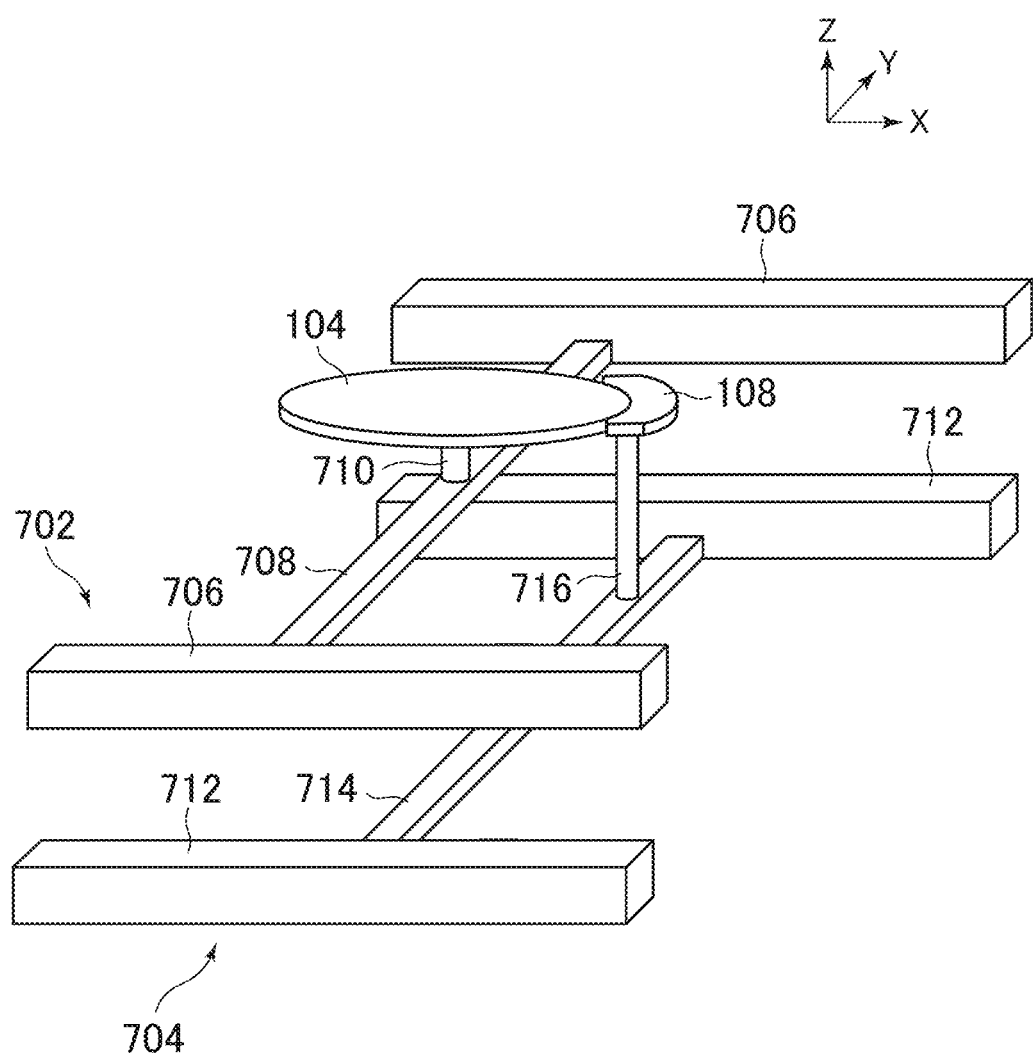
FIG. 7 is an explanatory view for illustrating a moving mechanism according to a second embodiment.

As illustrated in FIG. 7, the moving mechanism 110 according to the second embodiment includes a first XY stage 702 and a second XY stage 704. The first XY stage 702 moves a sample stage 104 to such a position in the XY plane being parallel to a surface of the sample stage 104 and a surface of a background correction cover 108 that primary X-rays 130 are radiated to a measurement position.

More specifically, the first XY stage 702 includes two first X drive shafts 706, a first Y drive shaft 708, and a first vertically moving device 710. Each of the two first X drive shafts 706 has an elongated shape. The two first X drive shafts 706 are fixed at the same height (at the same position in the Z-axis direction) with their longitudinal direction aligned with the X axis inside a sample chamber. Further, the two first X drive shafts 706 each have a rail for guiding the first Y drive shaft 708. The rails are provided on sides facing each other.

The first Y drive shaft 708 has an elongated shape. One end portion of the first Y drive shaft 708 is fitted into the rail of one of the first X drive shafts 706, and another end portion thereof is fitted into the rail of another one of the first X drive shafts 706. The first Y drive shaft 708 is moved in the X-axis direction by an actuator (not shown) while being guided by the two first X drive shafts 706. Further, the first Y drive shaft 708 has a rail for guiding the first vertically moving device 710 on its upper surface.

The first vertically moving device 710 is fitted into the rail of the first Y drive shaft 708, and is moved in the Y-axis direction by an actuator (not shown) while being guided by the first Y drive shaft 708. Further, the first vertically moving device 710 has an upper surface on which the sample stage 104 is arranged and has a configuration that is expandable and contractible in the Z-axis direction. With this configuration, the first vertically moving device 710 appropriately moves the sample stage 104 in the Z-axis direction. Further, the first vertically moving device 710 has a configuration that can rotate the sample stage 104 in the XY plane as desired.

The second XY stage 704 includes two second X drive shafts 712, a second Y drive shaft 714, and a second vertically moving device 716. Each of the two second X drive shafts 712 has an elongated shape. The two second X drive shafts 712 are fixed at the same height (at the same position in the Z-axis direction) with their longitudinal direction aligned with the X axis inside a sample chamber. Further, the two second X drive shafts 712 each have a rail for guiding the second Y drive shaft 714. The rails are provided on sides facing each other.

The second Y drive shaft 714 has an elongated shape. One end portion of the second Y drive shaft 714 is fitted into the rail of one of the second X drive shafts 712, and another end portion thereof is fitted into the rail of another one of the second X drive shafts 712. The second Y drive shaft 714 is moved in the X-axis direction by an actuator (not shown) while being guided by the two second X drive shafts 712. Further, the second Y drive shaft 714 has a rail for guiding the second vertically moving device 716 on its upper surface.

The second vertically moving device 716 is fitted into the rail of the second Y drive shaft 714, and is moved in the Y-axis direction by an actuator (not shown) while being guided by the first Y drive shaft 708. Further, the second vertically moving device 716 has an upper surface on which the background correction cover 108 is arranged and has a configuration that is expandable and contractible in the Z-axis direction. With this configuration, the second vertically moving device 716 appropriately moves the background correction cover 108 in the Z-axis direction. Further, the second vertically moving device 716 has a configuration that can rotate the background correction cover 108 in the XY plane as desired.

The first XY stage 702 and the second XY stage 704 are arranged so as not to interfere with each other in operation.

With the above-mentioned configuration of the moving mechanism 110, the sample stage 104 and the background correction cover 108 can be arranged at freely-selected positions within a range in which the first XY stage 702 and the second XY stage 704 can be driven. Thus, after a sample 128 is arranged on the sample stage 104 by a method similar to that used in the first embodiment, the sample 128 can be moved so that primary X-rays 130 are radiated to a freely-selected measurement position on the sample 128. Further, when the sample stage 104 is absent on the back side of the measurement position, the background correction cover 108 can be moved to the back side of the measurement position. Accordingly, also in the second embodiment, a uniform environment is achieved on the back side of the sample 128 immediately below the measurement position, and thus the measurement condition can be prevented from differing depending on the measurement position.

In the present disclosure, the sample stage 104 or the background correction cover 108 is only required to be arranged so as to be arranged on the back side of the measurement position. However, the configuration of the moving mechanism 110 is not limited to those described in the first embodiment and the second embodiment, and may be other configurations.

For example, the moving mechanism 110 may have a mechanism for rotating the sample stage 104. For example, when the moving mechanism 110 has a mechanism for rotating the sample stage 104 by an appropriate angle, by 90 degrees, or by 180 degrees for each rotation, a measurement can be conducted on the entire surface of the sample 128 by using the first XY stage 702, which has a small size and a small movement range, without an increase in size of the sample chamber.

Further, the moving mechanism 110 may have a rotary mechanism in place of the second XY stage 704. More specifically, the moving mechanism 110 may include, for example, the first XY stage 702 described above and a rotary mechanism for rotating the background correction cover 108 about a center of the first XY stage 702. When the sample stage 104 has a circular shape and has the holding portions 106, the background correction cover 108 has a shape similar to that of the background correction cover in the first embodiment. The background correction cover 108 is rotated around the sample stage 104 by the rotary mechanism so as to be arranged on the back side of the measurement position. In this case, the second XY stage 704, the first vertically moving device 710, and the second vertically moving device 716 are not used. Thus, the background correction cover 108 can be moved to the measurement position with only the simple rotary mechanism.

Figure 8:
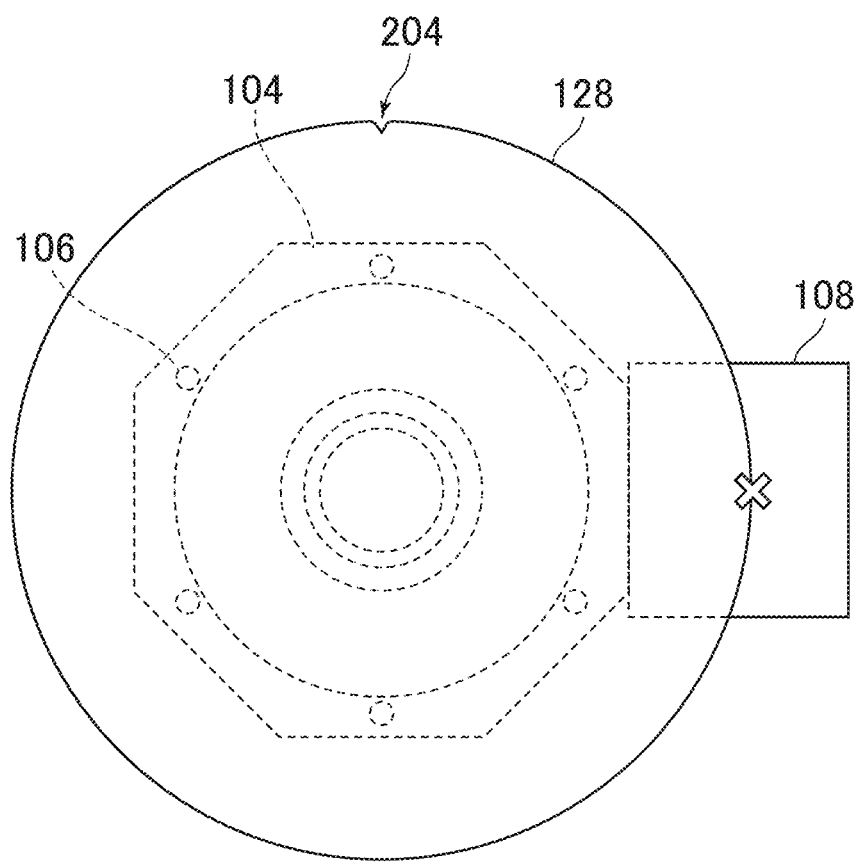
FIG. 8 is a view for illustrating a modification example of the sample stage and the background correction cover.

Further, for example, the shape of the sample stage 104 is not limited to a circular shape, and may be an octagonal shape as illustrated in FIG. 8, a square shape, a rectangular shape, or other polygonal shapes. Further, the shape of the background correction cover 108 is not limited to a semilunar shape, and may be a rectangular shape as illustrated in FIG. 8. Even in a configuration illustrated in FIG. 8, the background correction cover 108 having a rectangular shape may be arranged adjacent to one side of the sample stage 104 having an octagonal shape, and has an outer edge portion extending along a part of the outer edge of the sample stage 104. Thus, the sample stage 104 or the background correction cover 108 can be arranged on the back side of a freely-selected measurement position of the sample 128.

Further, the moving mechanism 110 may move the irradiation position of the primary X-rays from the X-ray source 102 and the background correction cover 108 without moving the sample stage 104. More specifically, the moving mechanism 110 may include an irradiation-position control unit and a rotary mechanism. The irradiation-position control unit controls the irradiation position of the primary X-rays from the X-ray source so that primary X-rays are radiated to a freely-selected measurement position on the surface of the sample 128. The rotary mechanism rotates the background correction cover 108 about the center of the sample stage 104. For example, the irradiation-position control unit moves the X-ray source 102 in the XY plane so that the primary X-rays are radiated to a freely-selected measurement position on the sample 128. Further, for example, the moving mechanism 110 may change a direction in which the X-ray source 102 faces, specifically, a direction in which the primary X-rays are radiated, so that the primary X-rays are radiated to a freely-selected measurement position on the sample 128. When the sample stage 104 is not located on the back side of the sample 128 at the measurement position, the rotary mechanism moves the background correction cover 108 to the measurement position. For example, when the sample stage 104 and the background correction cover 108 have shapes similar to those described in the first embodiment, the moving mechanism 110 rotates the background correction cover 108 around the sample stage 104. With the configuration described above, effects similar to those obtained in the embodiments described above can be achieved and the components for moving the sample stage 104 can be omitted.

Further, for example, a robot arm capable of moving the background correction cover 108 to a freely-selected position may be provided to the configuration in which the position of the sample stage 104 is fixed and the X-ray source 102 can radiate the primary X-rays 130 to a freely-selected position on the sample 128. The robot arm has, for example, four degrees of freedom including three degrees of freedom for moving the background correction cover 108 to a freely-selected position in an XYZ space inside the sample chamber and one degree of freedom for rotating the background correction cover 108 by any appropriate angle in the XY plane.

The present disclosure can be variously modified without being limited to the above-mentioned examples. The configuration of the e above-mentioned X-ray fluorescence spectrometer 100 is described as one example, and the present disclosure is not limited thereto. The configurations described in the above-mentioned examples may be replaced by configurations that are substantially the same as the configurations described in the above-mentioned examples, configurations that exhibit the same action and effect as those of the configurations described in the above-mentioned examples, or configurations that achieve the same object as that of the configurations described in the above-mentioned examples.

REFERENCE SIGNS LIST

100 X-ray fluorescence spectrometer, 102 X-ray source, 104 sample stage, 106 holding portion, 108, 108A, 108B background correction cover, 110 moving mechanism, 112 spectroscopic device, 114 detector, 116 goniometer, 118 counter, 120 information processing unit, 122 analysis unit, 124 correction unit, 126 light source, 127 light-receiving portion, 128 sample, 130 primary X-rays, 132 laser, 202 conveying arm, 204 cutout portion, 206 triple sun shaft, 208 sun arm, 210 double planetary shaft, 212 planetary arm, 214 sample shaft, 302 first sun shaft, 304 second sun shaft, 306 third sun shaft, 308 first planetary shaft, 310 second planetary shaft, 312 first sun gear, 314 first idler gear, 315 first idler shaft, 316 first planetary gear, 318 second sun gear, 320 second idler gear, 321 second idler shaft, 322 second planetary gear, 324 third planetary gear, 326 third idler gear, 327 third idler shaft, 328 sample gear, 330 to 337 bearing, 702 first XY stage, 704 second XY stage, 706 first X drive shaft, 708 first Y drive shaft, 710 first vertically moving device, 712 second X drive shaft, 714 second Y drive shaft, 716 second vertically moving device

The invention claimed is:
1. An X-ray fluorescence spectrometer, comprising:
an X-ray source configured to radiate primary X-rays to a surface of a sheet-shaped sample;
a detector configured to measure an intensity of fluorescent X-rays emitted from the sample irradiated with the primary X-rays;
a sample stage on which the sample is to be placed;
an analysis unit configured to perform an analysis based on the intensity of the fluorescent X-rays, which has been measured by the detector, at a plurality of measurement positions on the surface of the sample;
at least one background correction cover, which has an outer edge portion with a shape extending along a part of an outer edge of the sample stage, and is arranged adjacent to an outer side of the sample stage so that a surface of the background correction cover is substantially flush with a surface of the sample stage; and a moving mechanism configured to move the sample stage so that the primary X-rays are radiated to a freely-selected measurement position on the surface of the sample, wherein the moving mechanism moves the background correction cover based on movement of the sample stage and, when the sample stage is absent on a back side of the sample at a measurement position, moves the background correction cover so that the background correction cover is located on the back side of the sample at the measurement position.

2. The X-ray fluorescence spectrometer according to claim 1, wherein the background correction cover is made of the same material as a material of the sample stage.

3. The X-ray fluorescence spectrometer according to claim 1, wherein the sample stage has a holding portion with a protruding shape to be brought into abutment against a part of the sample.

4. The X-ray fluorescence spectrometer according to claim 1, wherein the moving mechanism includes:
    a triple sun shaft to be rotationally driven;
    a sun arm fixed to the triple sun shaft;
    a double planetary shaft being rotatably supported at a rotating end portion of the sun arm;
    a planetary arm fixed to the double planetary shaft; and
    a sample shaft being rotatably supported at a rotating end portion of the planetary arm,
wherein the sample stage is fixed to the sample shaft, and
wherein the background correction cover is fixed to the planetary arm.

5. The X-ray fluorescence spectrometer according to claim 1, wherein the moving mechanism includes:

an XY stage configured to move the sample stage in an XY plane being parallel to the surface of the sample stage and the surface of the background correction cover to such a position that the primary X-rays are radiated to the measurement position; and a rotary mechanism configured to rotate the background correction cover about a center of the sample stage.

6. The X-ray fluorescence spectrometer according to claim 1, wherein a distance from a center to the outer edge of the sample stage is smaller than a distance from a center to an outer edge of the sample, and wherein a distance from the center of the sample stage to an end portion of the background correction cover is larger than the distance from the center to the outer edge of the sample.

7. The X-ray fluorescence spectrometer according to claim 1, wherein the analysis unit includes a correction unit configured to perform a correction by subtracting a background intensity from the measured intensity measured by the detector.

8. The X-ray fluorescence spectrometer according to claim 1, wherein the sample stage has a circular shape, and wherein the outer edge portion of the background correction cover, which has a shape extending along the part of the outer edge of the sample stage, has an arc-like shape extending along the outer edge of the sample stage having the circular shape.

9. The X-ray fluorescence spectrometer according to claim 1, further comprising a sample detecting unit configured to detect, when the sample has a circular shape with a cutout portion, a position of the cutout portion of the sample, which is arranged on an outer side of the outer edge of the sample stage.

* * * * *